United States Patent
Wei et al.

(10) Patent No.: US 11,410,369 B2
(45) Date of Patent: Aug. 9, 2022

(54) METHOD FOR GENERATING ANIMATED EXPRESSION AND ELECTRONIC DEVICE

(71) Applicants: HUAWEI TECHNOLOGIES CO., LTD., Guangdong (CN); University of Science and Technology of China, Anhui (CN)

(72) Inventors: Yuan Wei, Shenzhen (CN); Wei Bai, Beijing (CN); Rihui Wu, Shenzhen (CN); Juyong Zhang, Hefei (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/360,866

(22) Filed: Jun. 28, 2021

(65) Prior Publication Data

US 2021/0327116 A1    Oct. 21, 2021

Related U.S. Application Data

(63) Continuation of application No. PCT/CN2019/113041, filed on Oct. 24, 2019.

(30) Foreign Application Priority Data

Dec. 29, 2018  (CN) .......................... 201811636045.2

(51) Int. Cl.
   *G06T 13/40*     (2011.01)
   *G06T 17/20*     (2006.01)

(52) U.S. Cl.
   CPC .............. *G06T 13/40* (2013.01); *G06T 17/20* (2013.01)

(58) Field of Classification Search
   None
   See application file for complete search history.

(56) References Cited

U.S. PATENT DOCUMENTS

2014/0240324 A1    8/2014  Becker et al.
2018/0033190 A1*   2/2018  Ma .......................... G06T 13/40

FOREIGN PATENT DOCUMENTS

CN    101149840 A    3/2008
CN    101216949 A    7/2008
(Continued)

OTHER PUBLICATIONS

Ken Anjyo, "Blendshape Facial Animation", Springer, Apr. 5, 2018. (Year: 2018).*

(Continued)

*Primary Examiner* — Nicholas R Wilson
(74) *Attorney, Agent, or Firm* — Huawei Technologies Co., Ltd.

(57) ABSTRACT

This application provides a method for generating an animation expression and an electronic device. The method for generating an animation expression includes: obtaining an initial three-dimensional mesh, where a vertex in the initial three-dimensional mesh is used to represent an expression feature of a face; transforming the initial three-dimensional mesh to obtain a target three-dimensional mesh, where a topological structure of the target three-dimensional mesh is the same as a topological structure of a basic blendshape; determining a personalized blendshape fitting the face based on the basic blendshape; determining personalized blendshape coefficients based on the target three-dimensional mesh and the personalized blendshape; and generating the animated expression based on the personalized blendshape coefficients.

19 Claims, 10 Drawing Sheets

(56) References Cited

FOREIGN PATENT DOCUMENTS

| CN | 103854306 A | 6/2014 |
| CN | 104217454 A | 12/2014 |
| CN | 106204698 A | 12/2016 |
| CN | 108629294 A | 10/2018 |
| CN | 108986221 A | 12/2018 |

OTHER PUBLICATIONS

Wang Heng, Research on Dynamic Expression Regresson Model for Real-time Facial Tracking and Animation, Beijing University of Posts and Telecommunications, Nov. 2018, 2 pages (abstract).

Chen Cao et al, FaceWarehouse: A 3D Facial Expression Database for Visual Computing, 2013, 11 pages.

Huo Jianglei, The Research of Data-Driven Real-Time Facial Expression Anim Ation, Dec. 2015, 62 pages with translation.

Chen Cao et al, 3D Shape Regression for Real-time Facial Animation, Computer Science, ACM Transactions on Graphics (TOG), Published 2013, total 10 pages.

\* cited by examiner

Initial three-dimensional mesh

Rigidly deformed three-dimensional mesh

Rigidly deformed topology reference mesh

Initial three-dimensional mesh

METHOD FOR GENERATING ANIMATED EXPRESSION AND ELECTRONIC DEVICE

CROSS-REFERENCE TO RELATED APPLICATIONS

This application is a continuation of International Application No. PCT/CN2019/113041, filed on Oct. 24, 2019, which claims priority to Chinese Patent Application No. 201811636045.2, filed on Dec. 29, 2018. The disclosures of the aforementioned applications are hereby incorporated by reference in their entireties.

TECHNICAL FIELD

This application relates to the field of image processing technologies, and more specifically, to a method for generating an animated expression and an electronic device.

BACKGROUND

When generating an animated expression, an electronic device usually first shoots a facial video by using a camera, extracts motion information of dense (or sparse) facial feature points, and then migrates the extracted motion information of the dense (or sparse) facial feature points to a virtual person (or anthropomorphic animal) face, to obtain an animated expression.

A specific process of generating an animated expression in a conventional solution may be as follows: first extracting feature points or point clouds (a series of points including facial features) representing facial expressions; then combining, based on the extracted feature points or point clouds, prestored blendshapes of a plurality of different identity features into a personalized blendshape fitting identity features of the face, and finally generating the animated expression based on the personalized blendshape.

However, because the feature points or point clouds cannot well reflect expression features of the face, a display effect of the animated expression generated based on the point clouds or feature points in the conventional solution is not ideal.

SUMMARY

This application provides a method for generating an animated expression (also translated as facial animation) and an electronic device, to improve a display effect of an animated expression.

According to a first aspect, a method for generating an animated expression is provided. The method includes: obtaining an initial three-dimensional mesh; transforming the initial three-dimensional mesh to obtain a target three-dimensional mesh; determining, based on a basic blendshape (also translated as expression base), a personalized blendshape fitting a face; determining personalized blendshape coefficients based on the target three-dimensional mesh and the personalized blendshape, where combination of the personalized blendshape coefficients and blendshapes of the personalized blendshape is used to represent an expression feature of the face; and generating the animated expression based on the personalized blendshape coefficients.

Vertices in the initial three-dimensional mesh are used to represent the expression feature of the face. A topology structure of the target three-dimensional mesh is the same as a topology structure of the basic blendshape.

By transforming the initial three-dimensional mesh, the target three-dimensional mesh having the same topology structure as the basic blendshape can be obtained, to implement the unification of the topology structure, thereby finally obtaining the animated expression based on the target three-dimensional mesh subsequently.

In addition, the personalized blendshape fitting the face may be a blendshape including an identity feature of the face, and a topology structure of the personalized blendshape is the same as the topology structure of the basic blendshape.

The personalized blendshape may include blendshapes corresponding to a plurality of expressions. For example, the personalized blendshape may include blendshapes of some common expressions (for example, 47 common expressions) of a face.

The animated expression may be specifically a continuous animated expression corresponding to one animated video, or may be a static animated expression corresponding to one frame of video image.

For example, when the initial three-dimensional mesh includes a facial expression corresponding to one frame of image, the finally generated animated expression is an animated expression corresponding to one frame of image.

Optionally, the generating an animated expression based on the personalized blendshape coefficients includes: generating the animated expression based on the personalized blendshape coefficients and an anthropomorphic role blendshape.

The generating the animated expression based on the personalized blendshape coefficients and an anthropomorphic role blendshape may refer to migrating the personalized blendshape coefficients to the anthropomorphic role blendshape to generate the animated expression.

The anthropomorphic role blendshape may be a virtual person blendshape, or may be an anthropomorphic animal blendshape.

In this application, because the three-dimensional mesh includes more vertex information, the three-dimensional mesh can better reflect the expression feature of the face. In addition, by transforming the three-dimensional mesh, a topology structure of the transformed three-dimensional mesh can be consistent with the topology structure of the basic blendshape. Therefore, an animated expression closer to the expression feature of the face can be finally generated based on the transformed three-dimensional mesh.

Specifically, because the expression feature reflected by the generated animated expression is closer to the expression feature of the facial expression, the animated expression can be more realistic, and a display effect of the animated expression can be improved.

With reference to the first aspect, in some implementations of the first aspect, the personalized blendshape includes a plurality of blendshapes, the plurality of blendshapes respectively correspond to different expressions, and the determining personalized blendshape coefficients based on the target three-dimensional mesh and the personalized blendshape includes: determining the personalized blendshape coefficients based on a difference between a linear combination of coordinates of reference vertices in the plurality of blendshapes and coordinates of a vertex in the target three-dimensional mesh.

A reference vertex in each of the plurality of blendshapes is a point that is in each blendshape and that is at a corresponding position of the vertex in the target three-dimensional mesh.

With reference to the first aspect, in some implementations of the first aspect, the determining the personalized blendshape coefficients based on a difference between a linear combination of coordinates of reference vertices in the plurality of blendshapes and coordinates of a vertex in the target three-dimensional mesh includes: determining a plurality of first differences; and determining the personalized blendshape coefficients based on a sum of products of the plurality of first differences and corresponding weight values.

The plurality of first differences are differences between coordinates of a plurality of vertices in the target three-dimensional mesh and a linear combination of corresponding reference vertices in the plurality of blendshapes.

Optionally, the determining the personalized blendshape coefficients based on a sum of products of the plurality of first differences and corresponding weight values includes: when a minimum value is obtained from the sum of the products of the plurality of first differences and the corresponding weight values, determining linear combination coefficients when the coordinates of the reference vertices in the plurality of blendshapes are combined linearly as the personalized blendshape coefficients.

In this application, the linear combination coefficients corresponding to the minimum value of the sum of the products of the plurality of first differences and the corresponding weight values are determined as the personalized blendshape coefficients, so that the personalized blendshape coefficients can reflect the expression feature of the face as true as possible, so as to generate an animated expression closer to the expression feature of the face subsequently.

With reference to the first aspect, in some implementations of the first aspect, the plurality of first differences respectively correspond to a plurality of different weight values.

Optionally, the plurality of first differences respectively correspond to the plurality of vertices in the target three-dimensional mesh, where a weight value of a first difference corresponding to a vertex located in a first preset area in the target three-dimensional mesh is greater than or equal to a first preset weight value, and a weight of a first difference corresponding to a vertex located outside the first preset area in the target three-dimensional mesh is less than the first preset weight value.

The first preset area may be a key area in the target three-dimensional mesh, and the first preset area may be an area in which some important organs of the face are located. For example, the first preset area may be an area in which an eye is located, or the first preset area may be an area in which a mouth is located, or the first preset area may be an area in which an eye and a mouth are located.

The first preset area may be determined based on a simulation or emulation result, or the first preset area may be directly determined based on experience.

In this application, the plurality of first differences correspond to different weight values, and importance of the first differences corresponding to the vertices can be fully considered when the personalized blendshape coefficients are calculated, so that the personalized blendshape coefficients can be more accurately solved.

With reference to the first aspect, in some implementations of the first aspect, the personalized blendshape includes a plurality of blendshapes, the plurality of blendshapes respectively correspond to different expressions, and the determining personalized blendshape coefficients based on the target three-dimensional mesh and the personalized blendshape includes: determining a vertex distance of the target three-dimensional mesh; determining a reference distance corresponding to each of the plurality of blendshapes, to obtain a plurality of reference distances; and determining the personalized blendshape coefficients based on a difference between a linear combination of the plurality of reference distances and the vertex distance.

The vertex distance is a distance between two vertices in the target three-dimensional mesh.

In addition, the reference distance corresponding to each blendshape is a distance between two reference vertices in each blendshape, and the two reference vertices are points that are in each blendshape and that are at corresponding positions of the two vertices in the target three-dimensional mesh.

With reference to the first aspect, in some implementations of the first aspect, the determining the personalized blendshape coefficients based on a difference between a linear combination of the plurality of reference distances and the vertex distance includes: determining a plurality of second differences; and determining the personalized blendshape coefficients based on a sum of products of the plurality of second differences and corresponding weight values.

The plurality of second differences are differences between a plurality of vertex distances in the target three-dimensional mesh and a linear combination of corresponding reference distances in the plurality of blendshapes.

Optionally, the determining the personalized blendshape coefficients based on a sum of products of the plurality of second differences and corresponding weight values includes: when a minimum value is obtained from the sum of the products of the plurality of second differences and the corresponding weight values, determining linear combination coefficients when the plurality of reference distances are linearly combined as the personalized blendshape coefficients.

In this application, the linear combination coefficients corresponding to the minimum value of the sum of the products of the plurality of second differences and the corresponding weight value are determined as the personalized blendshape coefficients, so that the personalized blendshape coefficients can reflect the expression feature of the face as true as possible, so as to generate an animated expression closer to the expression feature of the face subsequently.

Optionally, in this application, the personalized blendshape coefficients may be solved based on the first difference or the second difference, or the personalized blendshape coefficients may be solved by combining the first difference and the second difference together.

With reference to the first aspect, in some implementations of the first aspect, the plurality of second differences respectively correspond to a plurality of different weight values.

Optionally, the plurality of second differences respectively correspond to the plurality of vertex distances in the target three-dimensional mesh, where a weight value of a second difference corresponding to a vertex distance between vertices located in a second preset area in the target three-dimensional mesh is greater than or equal to a second preset weight value, and a weight of a second difference corresponding to a vertex distance between vertices located outside the second preset area in the target three-dimensional mesh is less than the second preset weight value.

The second preset area may be a key area in the target three-dimensional mesh, and the second preset area may be an area in which some important organs of the face are located. For example, the second preset area may be an area in which an eye is located. In this case, a weight value of a second difference corresponding to a vertex distance between a vertex corresponding to an upper eyelid and a vertex corresponding to a lower eyelid may be greater than the second preset weight value. For another example, the second preset area may be an area in which a mouth is located. In this case, a weight value of a second difference corresponding to a vertex distance between a vertex corresponding to an upper lip and a vertex corresponding to a lower lip may be greater than the second preset weight value.

The second preset area may be determined based on an actual simulation or emulation result, or the second preset area may be determined based on experience.

In this application, the plurality of second differences correspond to different weight values, and importance of second differences corresponding to different vertex distances can be fully considered when the personalized blendshape coefficients are calculated, so that the personalized blendshape coefficients can be more accurately solved.

With reference to the first aspect, in some implementations of the first aspect, the transforming the initial three-dimensional mesh to obtain a target three-dimensional mesh includes: determining a topology reference mesh; performing rigid (rigid) deformation on the topology reference mesh, to obtain a rigidly deformed topology reference mesh; performing fitting processing on the rigidly deformed topology reference mesh and the initial three-dimensional mesh until a fitting degree between the rigidly deformed topology reference mesh and the initial three-dimensional mesh meets a preset fitting degree; and replacing coordinates of vertices in the rigidly deformed topology reference mesh with coordinates of vertices that are in the initial three-dimensional mesh and that fit the vertices in the rigidly deformed mesh, to obtain the target three-dimensional mesh.

A topology structure of the topology reference mesh is the same as the topology structure of the basic blendshape, and the topology reference mesh may be used to transform the initial three-dimensional mesh. A size of the rigidly deformed topology reference mesh is the same as a size of the initial three-dimensional mesh. The target three-dimensional mesh finally obtained in the foregoing process has the topology structure of the topology reference mesh and a shape of the initial three-dimensional mesh.

Optionally, the performing rigid deformation on the topology reference mesh includes: rotating, translating, or scaling the topology reference mesh.

In addition to that the size of the rigidly deformed topology reference mesh is the same as the size of the initial three-dimensional mesh, an orientation of the rigidly deformed topology reference mesh may also be the same as an orientation of the initial three-dimensional mesh.

In addition, that a fitting degree between the rigidly deformed topology reference mesh and the initial three-dimensional mesh meets a preset fitting degree may mean that a distance between a vertex in the initial three-dimensional mesh and a corresponding reference vertex in the rigidly deformed topology reference mesh is less than a preset distance.

With reference to the first aspect, in some implementations of the first aspect, the performing fitting processing on the rigidly deformed topology reference mesh and the initial three-dimensional mesh until a fitting degree between the rigidly deformed topology reference mesh and the initial three-dimensional mesh meets a preset fitting degree includes: repeating step A and step B until a fitting degree between a non-rigidly (non-rigid) deformed topology reference mesh and the initial three-dimensional mesh meets the preset fitting degree;

step A and step B are respectively as follows:

Step A: Perform non-rigid deformation on the rigidly deformed topology reference mesh based on a radial basis function RBF, to obtain a non-rigidly deformed topology reference mesh.

Step B: Fit the non-rigidly deformed topology reference mesh to the initial three-dimensional mesh.

It should be understood that the non-rigid deformation may mean that the entire mesh cannot be uniformly deformed by using single rotation, translation, or scaling, but different areas inside the mesh are deformed by using different rotation, translation, or scaling manners (different areas in the mesh have different deformation manners). In a non-rigid deformation process, relative motion may occur in the different areas inside the mesh.

In this application, by iteration of step A and step B, a fitting degree between the non-rigidly deformed topology reference mesh and the initial three-dimensional mesh can meet a fitting requirement, so that a target three-dimensional mesh obtained after the fitting has both the topology structure of the topology reference mesh and the shape of the initial three-dimensional mesh, so as to generate an animated expression closer to the expression feature of the face subsequently.

Optionally, the basic blendshape is formed by a plurality of groups of blendshapes of different identity features, and the determining, based on a basic blendshape, a personalized blendshape fitting a face includes: determining the personalized blendshape based on the plurality of groups of blendshapes of different identity features.

In the basic blendshape, each identity feature corresponds to one group of blendshapes, and each group of blendshapes includes blendshapes of a plurality of expressions.

Optionally, the determining the personalized blendshape based on the plurality of groups of blendshapes of different identity features includes: superimposing the plurality of groups of blendshapes of different identity features based on identity feature information of the face, to obtain the personalized blendshape.

In this application, when the basic blendshape is formed by a plurality of groups of blendshapes of different identity features, the personalized blendshape can be more accurately deduced based on the plurality of groups of blendshapes.

Optionally, the basic blendshape is an average blendshape, and the determining, based on a basic blendshape, a personalized blendshape fitting a face includes: determining the personalized blendshape based on the average blendshape.

The average blendshape may be obtained by processing the plurality of groups of blendshapes of different identity features, and the average blendshape can reflect one average identity feature.

Optionally, the determining the personalized blendshape based on the average blendshape includes: transforming the average blendshape based on the identity feature information of the face, to obtain the personalized blendshape.

In this application, when the basic blendshape is an average blendshape, storage overheads for storing the basic blendshape can be reduced, and storage resources can be saved.

According to a second aspect, a method for generating an animated expression is provided. The method includes: obtaining an initial three-dimensional mesh sequence; transforming the initial three-dimensional mesh sequence to obtain a target three-dimensional mesh sequence; determining, based on a basic blendshape, a personalized blendshape fitting a face; generating a personalized blendshape coefficient sequence based on the target three-dimensional mesh sequence and the personalized blendshape; and generating the animated expression based on the personalized blendshape coefficient sequence.

The initial three-dimensional mesh sequence includes a plurality of initial three-dimensional meshes, and the plurality of initial three-dimensional meshes are separately used to represent expression features of the face at a plurality of different moments. The target three-dimensional mesh sequence includes a plurality of target three-dimensional meshes, and a topology structures the plurality of target three-dimensional meshes is the same as a topology structure of the basic blendshape. The personalized blendshape fitting the face may be a blendshape including an identity feature of the face. The personalized blendshape sequence includes a plurality of groups of personalized blendshape coefficients, and combination of the personalized blendshape coefficients in the personalized blendshape coefficient sequence and blendshapes in the personalized blendshape is used to represent the expression feature of the face.

It should be understood that the initial three-dimensional mesh sequence in the second aspect may be formed by the plurality of initial three-dimensional meshes in the first aspect; the target three-dimensional mesh sequence in the second aspect may alternatively be formed by the plurality of target three-dimensional meshes in the first aspect; and the personalized blendshape sequence in the second aspect may be formed by the plurality of groups of personalized blendshape sequences in the first aspect. Limitations and explanations on the initial three-dimensional mesh, the target three-dimensional mesh, and the personalized blendshape coefficients in the first aspect are also applicable to the initial three-dimensional meshes in the initial three-dimensional mesh sequence, the target three-dimensional meshes in the target three-dimensional mesh sequence, and the personalized blendshape coefficients in the personalized blendshape sequence in the second aspect.

In this application, because the three-dimensional mesh includes more vertex information, the three-dimensional mesh can better reflect the expression feature of the face. In addition, by transforming the three-dimensional mesh, a topology structure of the transformed three-dimensional mesh can be consistent with the topology structure of the basic blendshape. Therefore, an animated expression closer to the expression feature of the face can be finally generated based on the transformed three-dimensional mesh.

Specifically, because the expression feature reflected by the generated animated expression is closer to the expression feature of the facial expression, the animated expression can be more realistic, and a display effect of the animated expression can be improved.

According to a third aspect, an electronic device is provided. The electronic device includes modules configured to perform the method according to the first aspect and any one of the implementations of the first aspect.

According to a fourth aspect, an electronic device is provided. The electronic device includes modules configured to perform the method according to the second aspect and any one of the implementations of the second aspect.

According to a fifth aspect, an electronic device is provided, including a memory and a processor. The memory is configured to store a program, and the processor is configured to execute the program stored in the memory. When the program stored in the memory is executed by the processor, the processor is configured to perform the method according to the first aspect and any one of the implementations of the first aspect.

According to a sixth aspect, an electronic device is provided, including a memory and a processor. The memory is configured to store a program, and the processor is configured to execute the program stored in the memory. When the program stored in the memory is executed by the processor, the processor is configured to perform the method according to the second aspect and any one of the implementations of the second aspect.

Optionally, the memory is a non-volatile memory.

Optionally, the memory and the processor are coupled to each other.

According to a seventh aspect, a computer-readable storage medium is provided. The computer-readable storage medium is configured to store program code, and when the program code is executed by a computer, the computer is configured to perform the method according to the first aspect and any one of the implementations of the first aspect.

According to an eighth aspect, a computer-readable storage medium is provided. The computer-readable storage medium is configured to store program code, and when the program code is executed by a computer, the computer is configured to perform the method according to the second aspect and any one of the implementations of the second aspect.

Optionally, the computer-readable storage medium may be located inside an electronic device, and the program code stored in the computer-readable storage medium may be executed by the electronic device.

When the program code stored in the computer-readable storage medium is executed by the electronic device, the electronic device can perform the method in the implementations of any one of the first aspect or the second aspect.

According to a ninth aspect, a chip is provided. The chip includes a processor, and the processor is configured to perform the method according to the first aspect and any one of the implementations of the first aspect.

According to a tenth aspect, a chip is provided. The chip includes a processor, and the processor is configured to perform the method according to the second aspect and any one of the implementations of the second aspect.

Optionally, the chip is installed inside the electronic device.

According to an eleventh aspect, a computer program (or referred to as a computer program product) used to enable a computer or an electronic device to perform the method according to the first aspect and any one of the implementations of the first aspect is provided.

According to a twelfth aspect, a computer program (or referred to as a computer program product) used to enable a computer or an electronic device to perform the method according to the second aspect and any one of the implementations of the second aspect is provided.

Optionally, the computer program may be stored in the electronic device, and the computer program may be executed by the electronic device.

When the electronic device executes the computer program, the electronic device can perform the method according to the implementations of any one of the first aspect or the second aspect.

Optionally, the electronic device may be a mobile terminal (for example, a smartphone), a computer, a personal digital assistant, a wearable device, an in-vehicle device, an

DESCRIPTION OF EMBODIMENTS

The following describes technical solutions of this application with reference to accompanying drawings.

A method for generating an animated expression in the embodiments of this application may be executed by an electronic device.

The electronic device may be a mobile terminal (for example, a smartphone), a computer, a personal digital assistant, a wearable device, an in-vehicle device, an Internet of Things device, an AR device, a VR device, or the like.

In addition, the electronic device may be another device that can display a video picture or display a picture.

The electronic device may be a device running various operating systems. For example, the electronic device may be a device running an Android system, or may be a device running an IOS system, or may be a device running a Windows system.

Figure 1:
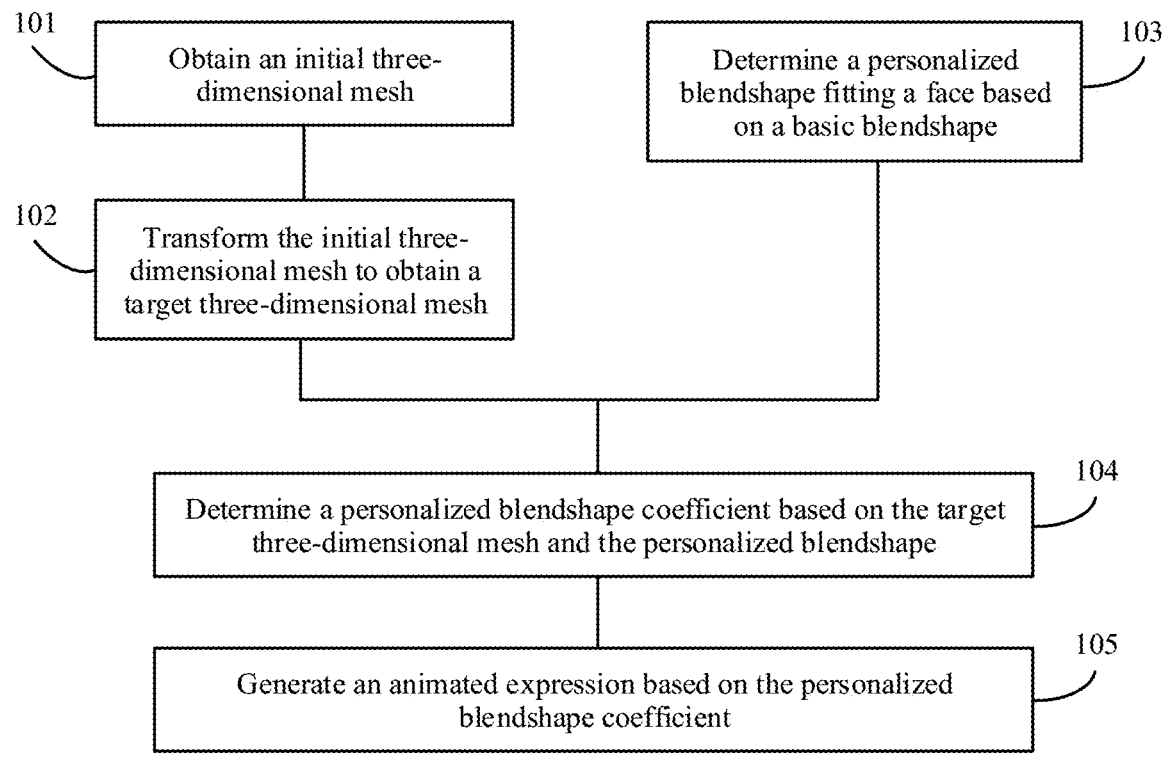
FIG. 1 is a schematic flowchart of a method for generating an animated expression according to an embodiment of this application.

FIG. 1 is a schematic flowchart of a method for generating an animated expression according to an embodiment of this application. The method shown in FIG. 1 may be performed by an electronic device. The method shown in FIG. 1 includes steps 101 to 105. The following describes these steps in detail.

101. Obtain an initial three-dimensional mesh.

Before step 101, an initial three-dimensional mesh may be extracted from an input video or image by using a neural network, and the initial three-dimensional mesh is used to represent an expression feature of a face.

The initial three-dimensional mesh may include a large quantity of vertices (vertex). These vertices correspond to positions of the face. Positions of these vertices and a position relationship between these vertices may be used to represent a feature expression of the face.

102. Transform the initial three-dimensional mesh to obtain a target three-dimensional mesh.

A topology structure of the target three-dimensional mesh is the same as a topology structure of a basic blendshape.

In step 102, by transforming the initial three-dimensional mesh, the target three-dimensional mesh having the same topology structure as the basic blendshape can be obtained, to implement the unification of the topology structure, thereby finally obtaining the animated expression based on the target three-dimensional mesh subsequently.

The transforming the initial three-dimensional mesh to obtain a target three-dimensional mesh in step 102 may specifically include the following steps:

201. Determine a topology reference mesh.

202. Perform rigid deformation on the topology reference mesh to obtain a rigidly deformed topology reference mesh, where a size of the rigidly deformed topology reference mesh is the same as a size of the initial three-dimensional mesh.

203. Perform fitting processing on the rigidly deformed topology reference mesh and the initial three-dimensional mesh until a fitting degree between the rigidly deformed topology reference mesh and the initial three-dimensional mesh meets a preset fitting degree.

204. Replace coordinates of vertices in the rigidly deformed topology reference mesh with coordinates of vertices that are in the initial three-dimensional mesh and that fit the vertices in the rigidly deformed mesh, to obtain the target three-dimensional mesh, where the target three-dimensional mesh has the topology structure of the topology reference mesh and a shape of the initial three-dimensional mesh.

The topology reference mesh may be a reference mesh having a same topology structure as the basic blendshape or the personalized blendshape, and the topology reference mesh is used to transform the initial three-dimensional mesh.

The performing rigid deformation on the topology reference mesh in step 202 may refer to performing operations such as rotation, translation, and scaling on the topology reference mesh, so that a size and an orientation of the topology reference mesh are the same as those of the initial three-dimensional mesh.

Figure 2:
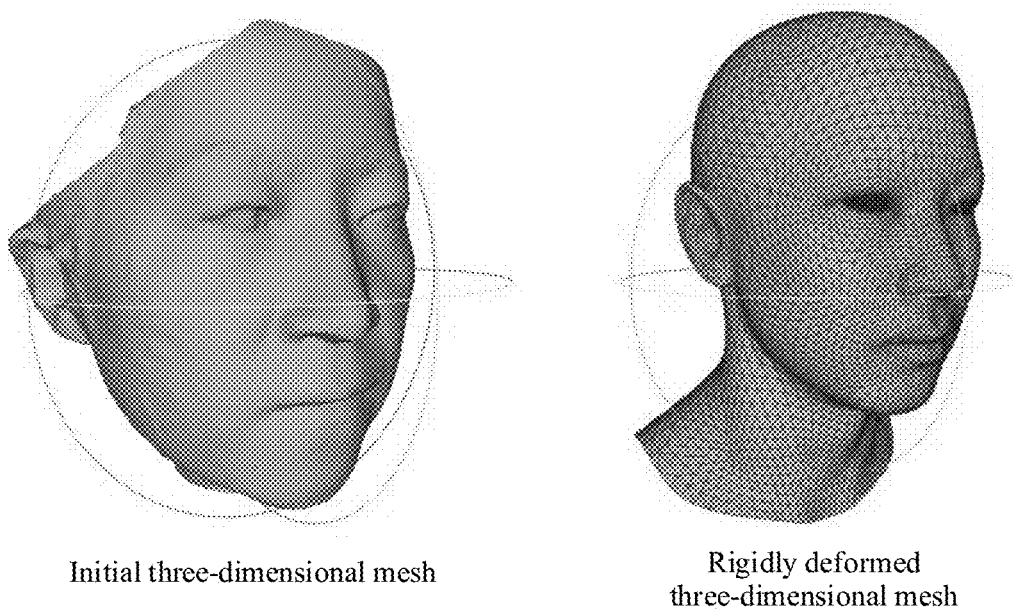
FIG. 2 is a schematic diagram of an initial three-dimensional mesh and a rigidly deformed three-dimensional mesh.

For example, as shown in FIG. 2, a size and an orientation of a rigidly deformed topology reference mesh obtained by performing rigid deformation on the topology reference mesh are the same as those of the initial three-dimensional mesh.

In step 203, fitting points between the rigidly deformed topology reference mesh and the initial three-dimensional mesh may be manually selected, then, fitting processing may be performed on the rigidly deformed topology reference mesh and the initial three-dimensional mesh based on the fitting points, so that corresponding fitting points of the rigidly deformed topology reference mesh coincide with corresponding fitting points of the initial three-dimensional mesh, to implement preliminary fitting. Next, fitting processing may be further performed on the rigidly deformed topology reference mesh and the initial three-dimensional mesh, so that the rigidly deformed topology reference mesh coincide with the initial three-dimensional mesh as many points as possible.

Figure 3:
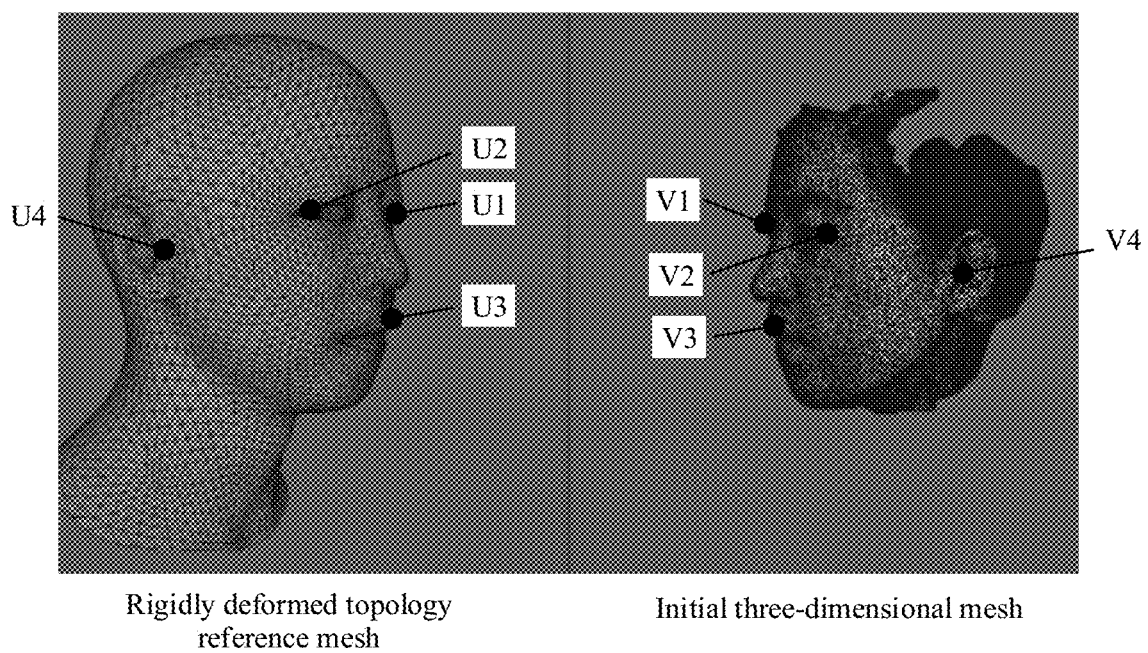
FIG. 3 is a schematic diagram of annotated fitting points in an initial three-dimensional mesh and a rigidly deformed three-dimensional mesh.

For example, as shown in FIG. 3, four vertices (V1, V2, V3, V4) in the initial three-dimensional mesh and four reference vertices (U1, U2, U3, U4) that are in the rigidly deformed topology reference mesh and that fit the four vertices may be manually selected. V1, V2, V3, and V4 are vertices respectively located at positions of the left eye, the right eye, the upper lip, and the right ear in the initial three-dimensional mesh, and U1, U2, U3, and U4 are also vertices at positions of the left eye, the right eye, the upper lip, and the right ear in the rigidly deformed topology reference mesh. After the fitting points shown in FIG. 3 are manually annotated, initial fitting may be performed on the initial three-dimensional mesh and the rigidly deformed topology reference mesh, so that the four vertices (V1, V2, V3, V4) in the initial three-dimensional mesh respectively coincide with the four reference vertices (U1, U2, U3, U4) in the rigidly deformed topology reference mesh.

In step 203, that a fitting degree between the rigidly deformed topology reference mesh and the initial three-dimensional mesh meets a preset fitting degree may mean that a distance between a vertex in the initial three-dimensional mesh and a corresponding reference vertex in the rigidly deformed topology reference mesh is less than a preset distance.

In step 204, performing coordinate replacement is equivalent to stretching the rigidly deformed topology reference mesh, so that the reference vertices in the rigidly deformed topology reference mesh completely fit the corresponding vertices in the initial three-dimensional mesh, and the stretched mesh is the target three-dimensional mesh.

In addition, when the fitting processing is performed on the rigidly deformed topology reference mesh and the initial three-dimensional mesh in step 203, the rigidly deformed topology reference mesh may be deformed while the rigidly deformed topology reference mesh is fitted to the initial three-dimensional mesh, so that the fitting degree meets the preset fitting degree.

Specifically, the fitting process in step 203 specifically includes the following steps:

Step A: Perform non-rigid deformation on the rigidly deformed topology reference mesh based on a radial basis function (RBF), to obtain a non-rigidly deformed topology reference mesh.

Step B: Fit the non-rigidly deformed topology reference mesh to the initial three-dimensional mesh.

Step A and step B are repeated until a fitting degree between the non-rigidly deformed topology reference mesh and the initial three-dimensional mesh meets the preset fitting degree.

In this application, by iteration of step A and step B, the fitting degree between the non-rigidly deformed topology reference mesh and the initial three-dimensional mesh can meet a fitting requirement, so that a target three-dimensional mesh obtained after the fitting has both the topology structure of the topology reference mesh and the shape of the initial three-dimensional mesh, so as to generate an animated expression closer to the expression feature of the face subsequently.

When performing the non-rigid deformation on the rigidly deformed topology reference mesh in step A, several fitting points in the rigidly deformed topology reference mesh and the initial three-dimensional mesh may be manually selected first, and next, based on the several fitting points, a vertex that is in the rigidly deformed topology reference mesh and that fits a vertex in the initial three-dimensional mesh may be further determined.

Specifically, the vertex that is in the rigidly deformed topology reference mesh and that fits the vertex of the initial three-dimensional mesh may be determined based on formula (1).

$$u_i + S_f(u_i) = v_i \quad (1)$$

$u_i$ is the vertex in the rigidly deformed topology reference mesh, $v_i$ is the vertex that is in the initial three-dimensional mesh and that fits $u_i$, and $S_f(u_i)$ is the radial basis function.

The coefficients in $S_f(u_i)$ may be obtained by using a linear equation constructed by existing fitting points (for example, the vertices V1, V2, and V3 in the initial three-dimensional mesh and the fitting vertices U1, U2, and U3 in the rigidly deformed topology reference mesh).

103. Determine, based on a basic blendshape, a personalized blendshape fitting the face.

The personalized blendshape fitting the face may be a blendshape including an identity feature of the face. In addition, a topology structure of the personalized blendshape is the same as the topology structure of the basic blendshape, and the basic blendshape may be a blendshape preset based on an application scenario.

The identity feature of the face may be a shape or feature of a facial organ. For example, the identity feature of the face may be a large eye, a small eye, a large mouth, a high-bridged nose, or the like.

The expression feature of the face refers to an action status of some organs of the face. For example, the expression feature of the face may include blinking, grinning, frowning, a bulging cheek, and the like.

In some cases, it may not be possible to distinguish between the expression feature of the face and the identity feature of the face by looking only at the shape of the face. For example, for a large mouth, it may not be possible to distinguish between a large mouth itself and a grinning expression. Therefore, in a process of generating an animated expression corresponding to a face, an identity feature and an expression feature of the face usually need to be distinguished.

It should be understood that the personalized blendshape may include a plurality of blendshapes, and each blendshape corresponds to one partial expression. For example, the personalized blendshape may include 47 blendshapes corresponding to 47 common partial expressions (the 47 expressions can cover expressions of parts such as an eyebrow, an eye, a nose, a mouth, a chin, and a cheek of a face).

The 47 partial expressions may include some common expressions of a face, for example, blinking, opening the mouth, frowning, or raising eyebrows. In addition, the expression may further include expressions obtained after some common expressions of a face are subdivided. For example, the 47 partial expressions may include expressions such as moving the inner side of the left eyebrow upward, lifting the right lower eyelid, and everting the upper lip.

Because the personalized blendshape is generated based on the basic blendshape, the topology structure of the personalized blendshape is also the same as the topology structure of the basic blendshape. Therefore, in this application, by transforming the initial three-dimensional mesh, the target three-dimensional mesh having the same topology structure as the basic blendshape can be obtained, so that a more accurate personalized blendshape coefficient is subsequently generated based on the target three-dimensional mesh and the personalized blendshape having the same topology structure, and a display effect of the finally generated animated expression can be improved.

In step 103, when the personalized blendshape fitting the face is determined based on the basic blendshape, different blendshapes may be used to deduce the personalized blendshape based on different compositions of the basic blendshape.

A first case: The basic blendshape is formed by a plurality of groups of blendshapes of different identity features.

In the first case, each identity feature corresponds to one group of blendshapes, and each group of blendshapes includes blendshapes of a plurality of expressions.

Figure 4:
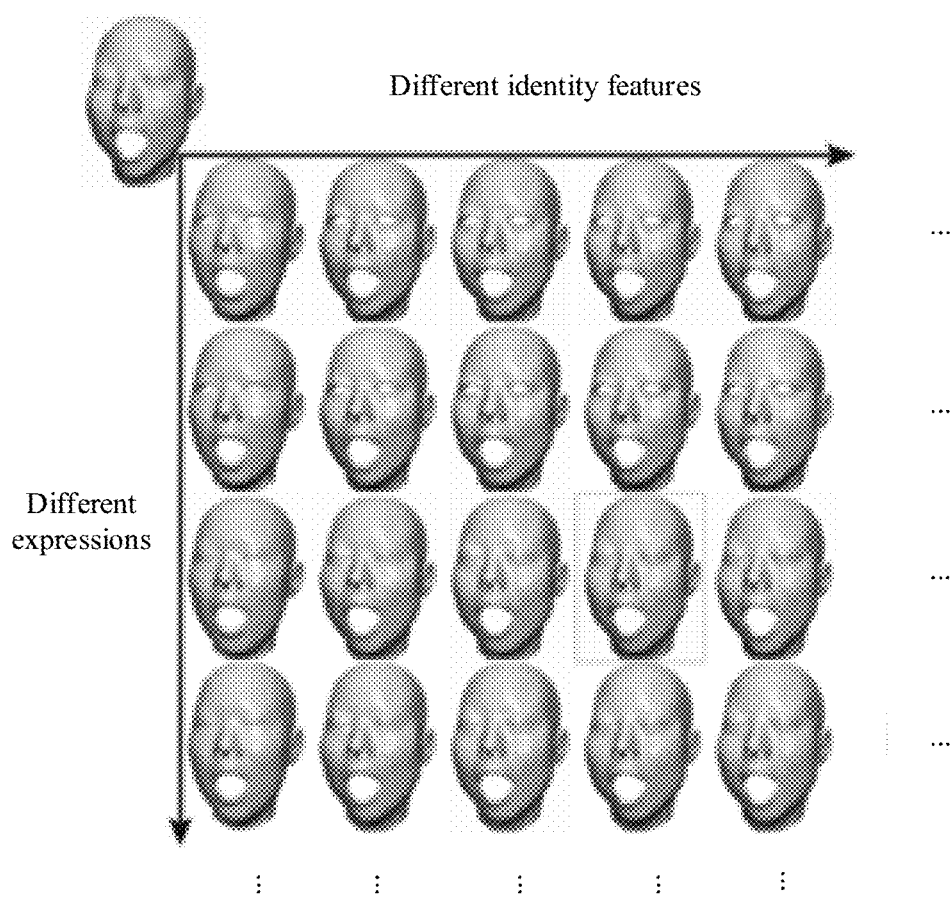
FIG. 4 is a schematic diagram of a basic blendshape.

For example, as shown in FIG. 4, the basic blendshape is formed by a plurality of groups of blendshapes of different identity features, where each group of blendshapes includes a plurality of blendshapes, and the plurality of blendshapes correspond to different partial expressions.

For another example, the basic blendshape may be formed by blendshapes of 50 common identity features, where each identity feature corresponds to one group of blendshapes, and one group of blendshapes corresponding to each identity feature may include blendshapes of 47 common expressions.

It is assumed that the basic blendshape is formed by blendshapes of 50 common identity features, and one group of blendshapes corresponding to each identity feature includes blendshapes of 47 expressions. In this case, the basic blendshape is formed by a total of 47*50=2350 blendshapes.

In the first case, the determining, based on a basic blendshape, a personalized blendshape fitting a face includes: determining the personalized blendshape based on a plurality of groups of blendshapes of different identity features.

In determining the personalized blendshape based on a plurality of groups of blendshapes of different identity features, identity feature information of the face further needs to be used, so that the generated personalized blendshape is a blendshape including an identity feature of the face.

Specifically, the determining the personalized blendshape based on a plurality of groups of blendshapes of different identity features includes: superimposing the plurality of groups of blendshapes of different identity features based on the identity feature information of the face, to obtain the personalized blendshape.

In the first case, when the basic blendshape is formed by a plurality of groups of blendshapes of different identity features, the personalized blendshape can be more accurately deduced based on the plurality of groups of blendshapes.

A second case: The basic blendshape is an average blendshape.

In the second case, the determining, based on a basic blendshape, a personalized blendshape fitting a face includes: determining the personalized blendshape based on the average blendshape of identity features.

The average blendshape may be obtained by processing the plurality of groups of blendshapes of different identity features, and the average blendshape can reflect an average identity feature. For example, the average blendshape may be obtained by superimposing 50 groups of blendshapes corresponding to the 50 identity features in the first case.

In determining the personalized blendshape based on the average blendshape, identity feature information of the face further needs to be used, so that the generated personalized blendshape is a blendshape including an identity feature of the face.

Specifically, the determining the personalized blendshape based on the average blendshape includes: transforming the average blendshape based on the identity feature information of the face, to obtain the personalized blendshape.

In the second case, when the basic blendshape is an average blendshape, storage overheads for storing the basic blendshape can be reduced, and storage resources can be saved.

In addition, the basic blendshape may alternatively be formed by one group of blendshapes corresponding to any identity feature For example, one group of blendshapes corresponding to any one of the 50 identity features in the first case may be selected as the basic blendshape, or any column of blendshapes in FIG. 4 (each column of blendshapes in FIG. 4 corresponds to one identity feature) may be selected as the basic blendshape. In this case, storage overheads for storing the basic blendshape can also be reduced, and storage resources can be saved.

104. Determine personalized blendshape coefficients based on the target three-dimensional mesh and the personalized blendshape.

Combination of the personalized blendshape coefficients and blendshapes of the personalized blendshape is used to represent an expression feature of the face. Herein, the combination of the personalized blendshape coefficients and the blendshapes of the personalized blendshape may be a linear combination or a nonlinear combination of the personalized blendshape coefficients and the blendshapes of the personalized blendshape.

In step 104, the target three-dimensional mesh is obtained by transforming the initial three-dimensional mesh, the target three-dimensional mesh can represent an expression feature of the face, and the combination of the personalized blendshape and the personalized blendshape coefficients can also represent an expression feature of the face. Therefore, in step 104, the personalized blendshape coefficients can be inferred based on the target three-dimensional mesh and the personalized blendshape parameter.

105. Generate an animated expression based on the personalized blendshape coefficients.

In this application, because the three-dimensional mesh includes more vertex information, the three-dimensional mesh can better reflect the expression feature of the face. In addition, by transforming the three-dimensional mesh, a topology structure of the transformed three-dimensional mesh can be consistent with the topology structure of the basic blendshape. Therefore, an animated expression closer to the expression feature of the face can be finally generated based on the transformed three-dimensional mesh.

Specifically, because the expression feature reflected by the generated animated expression is closer to the expression feature of the facial expression, the animated expression can be more realistic, and a display effect of the animated expression can be improved.

Specifically, in step 105, the animated expression may be generated based on the personalized blendshape coefficients and the anthropomorphic role blendshape. The anthropomorphic role blendshape herein may be specifically a virtual person blendshape or an anthropomorphic animal blendshape.

Types of partial expressions included in the anthropomorphic role blendshape are the same as types of expressions included in the personalized blendshape, and expression semantics of each expression in the anthropomorphic role blendshape are respectively the same as semantics of each expression included in the personalized blendshape.

For example, partial expressions corresponding to the personalized blendshape are shown in the first column of Table 1, and partial expressions corresponding to the anthropomorphic role blendshape are shown in the second column of Table 1. As shown in Table 1, when the partial expressions corresponding to the personalized blendshape include expressions such as blinking, opening the mouth, raising eyebrows, moving the inner side of the left eyebrow upward, and lifting the right lower eyelid, the anthropomorphic role blendshape also corresponds to the same partial expressions.

TABLE 1

| Partial expression corresponding to the personalized blendshape | Partial expression corresponding to the anthropomorphic role blendshape |
|---|---|
| Blink | Blink |
| Open the mouth | Open the mouth |
| Raise eyebrows | Raise eyebrows |
| Move the inner side of the left eyebrow upward | Move the inner side of the left eyebrow upward |
| Lift the right lower eyelid | Lift the right lower eyelid |
| . . . | . . . |

When generating an animated expression based on the personalized blendshape coefficients and the anthropomorphic role blendshape, it is equivalent to superimposing a plurality of partial expressions corresponding to the anthropomorphic role blendshape by using a series of coefficients, to finally obtain an animated expression closer to the expression feature of the face.

Figure 5:
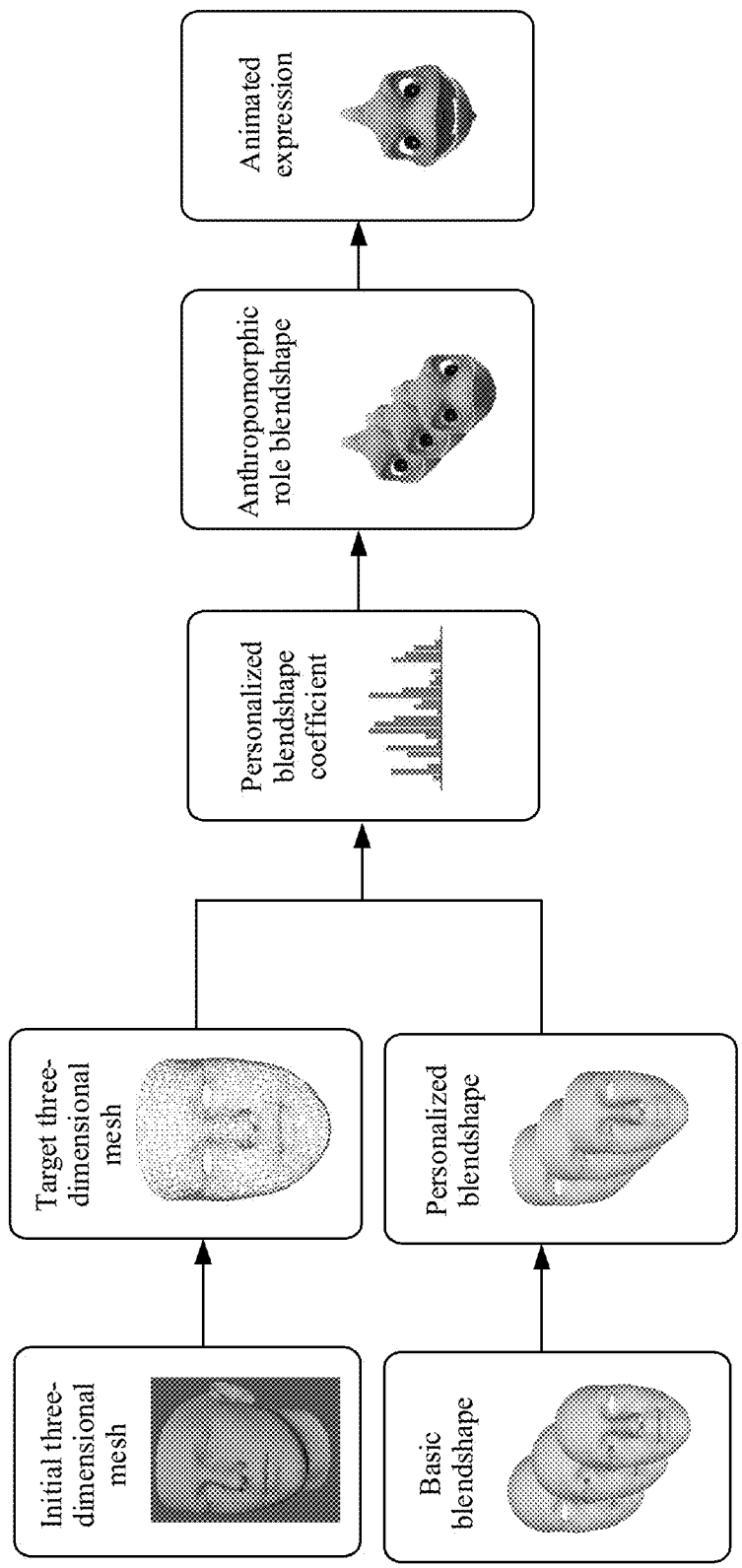
FIG. 5 is a schematic diagram of a method for generating an animated expression according to an embodiment of this application.

To better understand the entire process of the method for generating an animated expression in this embodiment of this application, the following describes a procedure of the method for generating an animated expression in this embodiment of this application with reference to FIG. 5.

FIG. 5 is a schematic diagram of a method for generating an animated expression according to an embodiment of this application.

As shown in FIG. 5, a target three-dimensional mesh may be obtained by transforming an initial three-dimensional mesh, and a personalized blendshape may be obtained by using a basic blendshape. When a personalized blendshape fitting a face is determined based on the basic blendshape, also refer to the initial three-dimensional mesh or the target three-dimensional mesh, so that the personalized blendshape includes an identity feature of the face. After the target three-dimensional mesh and the personalized blendshape are obtained, personalized blendshape coefficients may be determined based on the target three-dimensional mesh and the personalized blendshape, and then the personalized blendshape coefficients and the anthropomorphic role blendshape are combined to obtain an animated expression.

It should be understood that the processes shown in FIG. 5 have been described in detail in the method shown in FIG. 1. To avoid unnecessary repetition, details are not described herein again.

Optionally, in step 104, there are a plurality of specific implementations of determining personalized blendshape coefficients based on the target three-dimensional mesh and the personalized blendshape. The following separately describes these specific implementations in detail.

A first manner: Determine the personalized blendshape coefficients based on coordinates of reference vertices in a plurality of blendshapes and coordinates of a vertex in the target three-dimensional mesh.

Specifically, the personalized blendshape coefficients are determined based on a difference between a linear combination of the coordinates of the reference vertices in the plurality of blendshapes and the coordinates of the vertex in the target three-dimensional mesh.

Specifically, in the first manner, the personalized blendshape includes a plurality of blendshapes, the plurality of blendshapes respectively correspond to different expressions, and a reference vertex of each of the plurality of blendshapes is a point that is in each blendshape and that is at a corresponding position of the vertex in the target three-dimensional mesh.

Figure 6:
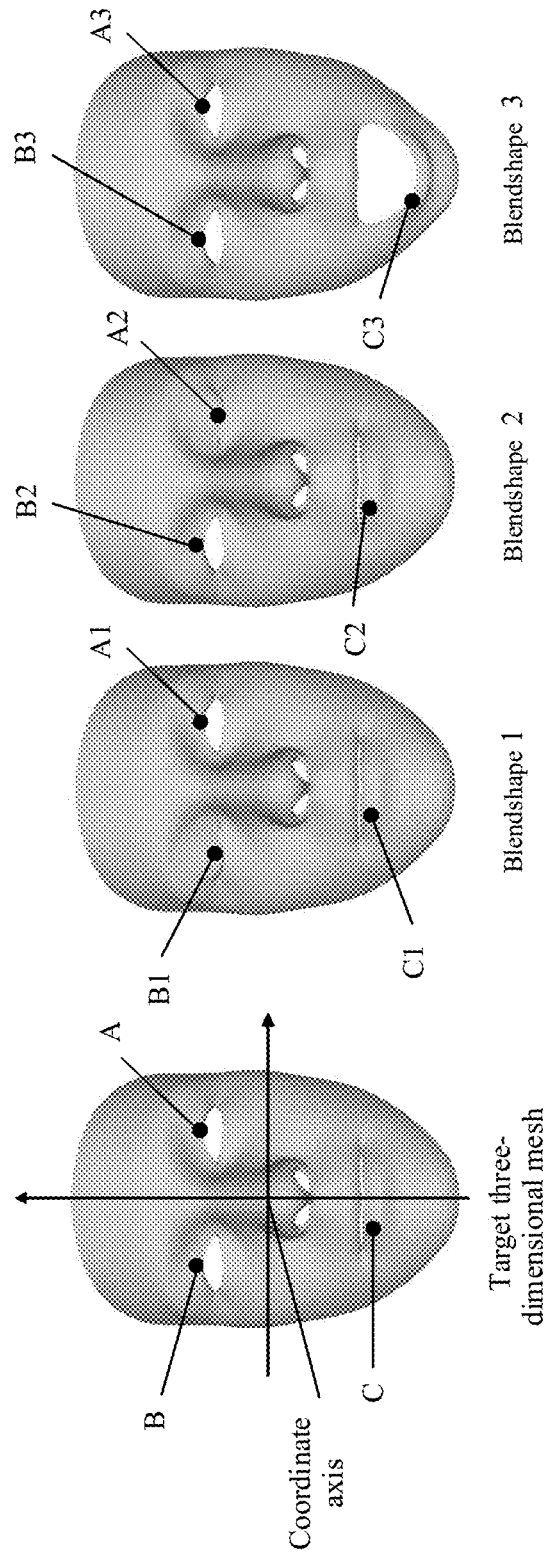
FIG. 6 is a schematic diagram of vertices in a target three-dimensional mesh and corresponding reference vertices in a plurality of blendshapes.

For example, as shown in FIG. 6, the target three-dimensional mesh includes a vertex A, a blendshape 1, a blendshape 2, and a blendshape 3 respectively include reference vertices A1, A2, and A3, and the reference vertices A1, A2, and A3 are points that are in the blendshape 1, the blendshape 2, and the blendshape 3 and that are at a corresponding position of the vertex A in the target three-dimensional mesh. In this case, a difference between a linear combination of coordinates of the reference vertices in the three blendshapes and coordinates of the vertex in the target three-dimensional mesh may be represented by using formula (2).

$$P(A)-[x*P(A1)+y*P(A2)+z*P(A3)] \quad (2)$$

$P(A)$ represents a coordinate value of the vertex A, $P(A1)$, $P(A2)$, and $P(A3)$ respectively represent coordinate values of the reference vertices A1, A2, and A3, and (x, y, z) are linear combination coefficients.

It should be understood that only three blendshapes are used as an example in FIG. 6. A specific quantity of blendshapes is not limited in this application.

In the first manner, the determining the personalized blendshape coefficients based on a difference between a linear combination of the coordinates of the reference vertices in the plurality of blendshapes and the coordinates of the vertex in the target three-dimensional mesh specifically includes: determining a plurality of first differences; and determining the personalized blendshape coefficients based on a sum of products of the plurality of first differences and corresponding weight values.

The plurality of first differences are differences between coordinates of a plurality of vertices in the target three-dimensional mesh and a linear combination of corresponding reference vertices in the plurality of blendshapes.

Optionally, the determining personalized blendshape coefficients based on a sum of products of the plurality of first differences and corresponding weight values includes: when a minimum value is obtained from the sum of the products of the plurality of first differences and the corresponding weight values, determining linear combination coefficients when the coordinates of the reference vertices in the plurality of blendshapes are combined linearly as the personalized blendshape coefficients.

It should be understood that a plurality of first differences may be obtained by using the foregoing formula (2), where each first difference is a difference between coordinates of different vertices in the target three-dimensional mesh and a linear combination of corresponding reference points in the plurality of blendshapes.

For example, as shown in FIG. 6, the target three-dimensional mesh further includes a vertex B and a vertex C, the blendshape 1 includes reference vertices B1 and C1, the blendshape 2 includes reference vertices B2 and C2, and the blendshape 3 includes reference vertices B3 and C3. The reference vertices B1, B2, and B3 are respectively points that are in the blendshape 1, the blendshape 2, and the blendshape 3 and that are at a corresponding position of the vertex B in the target three-dimensional mesh, the reference vertices C1, C2, and C3 are points that are in the blendshape 1, the blendshape 2, and the blendshape 3 and that are at a corresponding position of the vertex C in the target three-dimensional mesh. In this case, three first differences may be obtained based on FIG. 6, and the three first differences are respectively shown in formulas (2) to (4).

$$P(A)-[x*P(A1)+y*P(A2)+z*P(A3)] \quad (2)$$

$$P(B)-[x*P(B1)+y*P(B2)+z*P(B3)] \quad (3)$$

$$P(C)-[x*P(C1)+y*P(C2)+z*P(C3)] \quad (4)$$

After the foregoing formulas (2) to (4) are obtained, a sum of the foregoing formulas (2), (3), and (4) may be calculated, and values of coefficients (x, y, z) corresponding to a minimum value of the sum of the three formulas are determined as the personalized blendshape coefficients.

In this application, the linear combination coefficients corresponding to the minimum value of the sum of the products of the plurality of first differences and the corresponding weight values are determined as the personalized blendshape coefficients, so that the personalized blendshape coefficients can reflect the expression feature of the face as true as possible, so as to generate an animated expression closer to the expression feature of the face subsequently.

A second manner: Determine the personalized blendshape coefficients based on a difference between a linear combination of reference distances in the plurality of blendshapes and a vertex distance in the target three-dimensional mesh.

In the second manner, the personalized blendshape includes a plurality of blendshapes, the plurality of blendshapes respectively correspond to different expressions, and the determining personalized blendshape coefficients based on the target three-dimensional mesh and the personalized blendshape specifically includes:

determining a vertex distance of the target three-dimensional mesh; and determining a reference distance corresponding to each of the plurality of blendshapes, to obtain a plurality of reference distances; and determining the personalized blendshape coefficients based on a difference between a linear combination of the plurality of reference distances and the vertex distance.

The vertex distance is a distance between two vertices in the target three-dimensional mesh. The reference distance corresponding to each blendshape is a distance between two reference vertices in each blendshape, and the two reference vertices are points that are in each blendshape and that are at corresponding positions of the two vertices in the target three-dimensional mesh.

Figure 7:
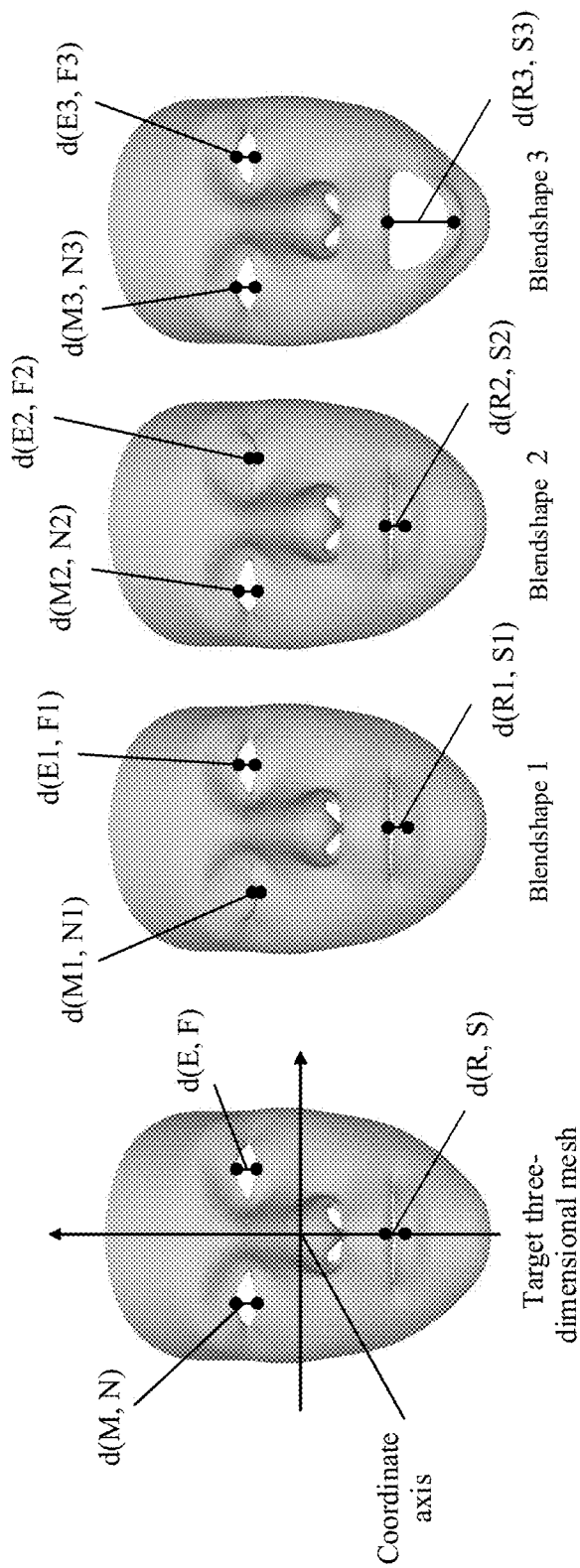
FIG. 7 is a schematic diagram of a vertex distance between vertices in a target three-dimensional mesh and a reference distance between corresponding reference vertices in a plurality of blendshapes.

For example, as shown in FIG. 7, the target three-dimensional mesh includes a vertex M and a vertex N, and a distance between the vertex M and the vertex N is D. The blendshape 1 includes vertices M1 and N1, M1 and N1, which are points that are in the blendshape 1 and that are at corresponding positions of the vertex M and the vertex N, and a distance between the vertex M1 and the vertex N1 is D1. The blendshape 2 includes vertices M2 and N2, M2 and N2, which are points that are in the blendshape 2 and that are at corresponding positions of the vertex M and the vertex N, and a distance between the vertex M2 and the vertex N2 is D2. The blendshape 3 includes vertices M3 and N3, M3 and N3, which are points that are in the blendshape 3 and that are at corresponding positions of the vertex M and the vertex N, and a distance between the vertex M3 and the vertex N3 is D3. D is the vertex distance in the target three-dimensional mesh, D1 is the reference distance in the blendshape 1, D2 is the reference distance in the blendshape 2, and D3 is the reference distance in the blendshape 3.

Using FIG. 7 as an example, a difference between a linear combination of reference distances of the three blendshapes and the vertex distance may be shown in formula (5).

$$d(M,N)-[u*d(M1,N1)+v*d(M2,N2)+w*d(M3,N3)] \quad (5)$$

It should be understood that only three blendshapes are used as an example in FIG. 7. A specific quantity of blendshapes is not limited in this application.

In the second manner, the determining the personalized blendshape coefficients based on a difference between a linear combination of the plurality of reference distances and the vertex distance specifically includes: determining a plurality of second differences; and determining the personalized blendshape coefficients based on a sum of products of the plurality of second differences and corresponding weight values.

The plurality of second differences are differences between a plurality of vertex distances in the target three-dimensional mesh and a linear combination of corresponding reference distances in the plurality of blendshapes.

Optionally, the determining the personalized blendshape coefficients based on a sum of products of the plurality of second differences and corresponding weight values includes: when a minimum value is obtained from the sum of the products of the plurality of second differences and the corresponding weight values, determining linear combination coefficients when the plurality of reference distances are linearly combined as the personalized blendshape coefficients.

It should be understood that the plurality of second differences may be obtained by using the foregoing formula (5), where each second difference is a difference between a different vertex distance in the target three-dimensional mesh and the linear combination of corresponding reference distances in the plurality of blendshapes.

For example, as shown in FIG. 7, a vertex distance between vertices included in the target three-dimensional mesh, reference vertices included in the blendshape 1, the blendshape 2, and the blendshape 3, and a reference vertex distance are as follows:

The target three-dimensional mesh further includes vertices M, N, R, and S, where a vertex distance between the vertices M and N is d(M, N), and a vertex distance between the vertices R and S is d(R, S).

The blendshape 1 includes reference vertices M1, N1, R1, and S1. These reference vertices are points at corresponding positions of the vertices M, N, R, and S respectively, a vertex distance between the vertices M1 and N1 is d(M1, N1), and a vertex distance between the vertices R1 and S1 is d(R1, S1).

The blendshape 2 includes reference vertices M2, N2, R2, and S2. These reference vertices are points at corresponding positions of the vertices M, N, R, and S respectively, a vertex distance between the vertices M2 and N2 is d(M2, N2), and a vertex distance between the vertices R2 and S2 is d(R2, S2).

The blendshape 3 includes reference vertices M3, N3, R3, and S3. These reference vertices are points at corresponding positions of the vertices M, N, R, and S respectively, a vertex distance between the vertices M3 and N3 is d(M3, N3), and a vertex distance between the vertices R3 and S3 is d(R3, S3).

In this case, three second differences may be obtained based on FIG. 7, and the three second differences are respectively shown in formulas (5) to (7).

$$d(M,N)-[u*d(M1,N1)+v*d(M2,N2)+w*d(M3,N3)] \quad (5)$$

$$d(E,F)-[u*d(E1,F1)+v*d(E2,F2)+w*d(E3,F3)] \quad (6)$$

$$d(R,S)-[u*d(R1,S1)+v*d(R2,S2)+w*d(R3,S3)] \quad (7)$$

After the foregoing formulas (5) to (7) are obtained, a sum of the foregoing formulas (5), (6), and (7) may be calculated, and values of coefficients (u, v, w) corresponding to a minimum value of the sum of the three formulas are determined as the personalized blendshape coefficients.

In this application, the linear combination coefficients corresponding to the minimum value of the sum of the products of the plurality of second differences and the corresponding weight values are determined as the personalized blendshape coefficients, so that the personalized blendshape coefficients can reflect the expression feature of the face as true as possible, so as to generate an animated expression closer to the expression feature of the face subsequently.

The first manner and the second manner are determining the personalized blendshape coefficients based on the first difference and the second difference respectively. Actually, the blendshape coefficient may alternatively be comprehensively determined based on the first difference and the second difference. The following describes the manner (a third manner) in detail.

The third manner: The personalized blendshape coefficients are comprehensively determined based on a difference between a linear combination of coordinates of reference vertices in the plurality of blendshapes and coordinates of a vertex in the target three-dimensional mesh, and a difference between a linear combination of reference distances in the plurality of blendshapes and a vertex distance in the target three-dimensional mesh.

The third manner is equivalent to a combination of the first manner and the second manner. In the third manner, the determining personalized blendshape coefficients based on the target three-dimensional mesh and the personalized blendshape includes:

determining a plurality of first differences;

determining a sum of products of the plurality of first differences and corresponding weight values, to obtain first values;

determining a plurality of second differences;

determining a sum of products of the plurality of second differences and corresponding weight values, to obtain second values; and determining the personalized blendshape coefficients based on sums of the first values and the second values.

When the personalized blendshape coefficients are determined based on the sums of the first values and the second values, linear combination coefficients corresponding to a minimum value of the sums of the first values and the second values may be determined as the personalized blendshape coefficients.

Using FIG. 6 and FIG. 7 as an example, three first differences and three second differences may be obtained, where the three first differences may be represented by using formulas (8) to (10), and the three second differences may be represented by using formulas (11) to (13).

$$P(A)-[x*P(A1)+y*P(A2)+z*P(A3)] \quad (8)$$

$$P(B)-[x*P(B1)+y*P(B2)+z*P(B3)] \quad (9)$$

$$P(C)-[x*P(C1)+y*P(C2)+z*P(C3)] \quad (10)$$

$$d(M,N)-[x*d(M1,N1)+y*d(M2,N2)+z*d(M3,N3)] \quad (11)$$

$$d(E,F)-[x*d(E1,F1)+y*d(E2,F2)+z*d(E3,F3)] \quad (12)$$

$$d(R,S)-[x*d(R1,S1)+y*d(R2,S2)+z*d(R3,S3)] \quad (13)$$

When the personalized blendshape coefficients are solved, values of coefficients (x, y, z) corresponding to a minimum value of a sum of formulas (8) to (13) may be determined as the personalized blendshape coefficients.

In the third manner, the personalized blendshape parameter is comprehensively determined by using the two differences, so that the personalized blendshape coefficients can be more accurately determined.

Optionally, the personalized blendshape coefficients may alternatively be determined by using a fourth manner.

The fourth manner: The personalized blendshape coefficients are determined based on formula (14).

$$E=E_{point}+E_{edge}+E_{lasso} \quad (14)$$

In the foregoing formula (14), $E_{point}$ represents a square of a sum of differences between a linear combination of coordinates of reference vertices in the plurality of blendshapes and coordinates of a vertex in the target three-dimensional mesh, $E_{edge}$ represents a square of a sum of differences between a linear combination of reference distances in the plurality of blendshapes and a vertex distance in the target three-dimensional mesh, and $E_{lasso}$ is a constraint function, used to sparse a finally obtained linearized blendshape coefficient (representing a facial expression with as few partial expressions as possible). $E_{point}$, $E_{edge}$ and $E_{lasso}$ may be obtained by using formulas (15) to (17).

$$E_{point} = \min \sum_i^N \left\| w_i \left( \sum_b^B x^b q_i^b - p_i \right) \right\|^2 \quad (15)$$

$$E_{edge} = \min \sum_{ij}^K \left\| w_{ij} \left( \sum_b^B x^b l_{ij}^b - e_{ij} \right) \right\|^2 \quad (16)$$

$$E_{lasso} = \min \sum_b^B \|x^b\|^1 \quad (17)$$

In the foregoing formula (15), B represents a quantity of blendshapes, b represents a $b^{th}$ blendshape, N represents a quantity of vertices in the target three-dimensional mesh (the quantity of vertices in each blendshape is also N), i represents an $i^{th}$ vertex, $q_i^b$ represents three-dimensional coordinates of the $i^{th}$ vertex in the $b^{th}$ blendshape, $x^b$ represents a combination coefficient of $q_i^b$, $p_i$ represents three-dimensional coordinates of the $i^{th}$ vertex in the target three-dimensional mesh, and $w_i$ is a weight value of $q_i^b x^b - p_i$;

In the foregoing formula (16), B represents a quantity of blendshapes, b represents a $b^{th}$ blendshape, i and j represent an $i^{th}$ vertex and a $j^{th}$ vertex respectively, K represents a quantity of edges, $l_{ij}^b$ represents a distance between the $i^{th}$ vertex and the $j^{th}$ vertex in the $b^{th}$ blendshape, $e_{ij}$ represents a distance between the $i^{th}$ vertex and the $j^{th}$ vertex in the target three-dimensional mesh, $x^b$ represents a combination coefficient of $l_{ij}^b$, and $w_{ij}$ is a weight value of $l_{ij}^b x^b - e_{ij}$.

In the foregoing formula (17), $x^b$ represents a combination coefficient of $q_i^b$, and $$\sum_b^B \|x^b\|^1$$

represents a sum of absolute values of all blendshape coefficients.

When the personalized blendshape coefficients are determined based on the foregoing formula (14), linear combination coefficients corresponding to a minimum value of E may be determined as the personalized blendshape coefficients.

In addition, in this application, $E_{lasso}$ is used to restrict the personalized blendshape coefficients, so that finally obtained personalized blendshape coefficients are relatively sparse (there are more 0s in the personalized blendshape coefficients), and finally, an animated expression can be expressed by using a blendshape with fewer expressions.

The foregoing describes in detail the method for generating an animated expression in the embodiments of this application with reference to FIG. 1 to FIG. 7. Actually, in the method shown in FIG. 1, a plurality of initial three-dimensional meshes may alternatively be obtained to obtain an initial three-dimensional mesh sequence, and then an animated expression is finally generated based on the initial three-dimensional mesh sequence. The following describes the process of finally generating an animated expression based on the initial three-dimensional mesh sequence with reference to FIG. 8.

Figure 8:
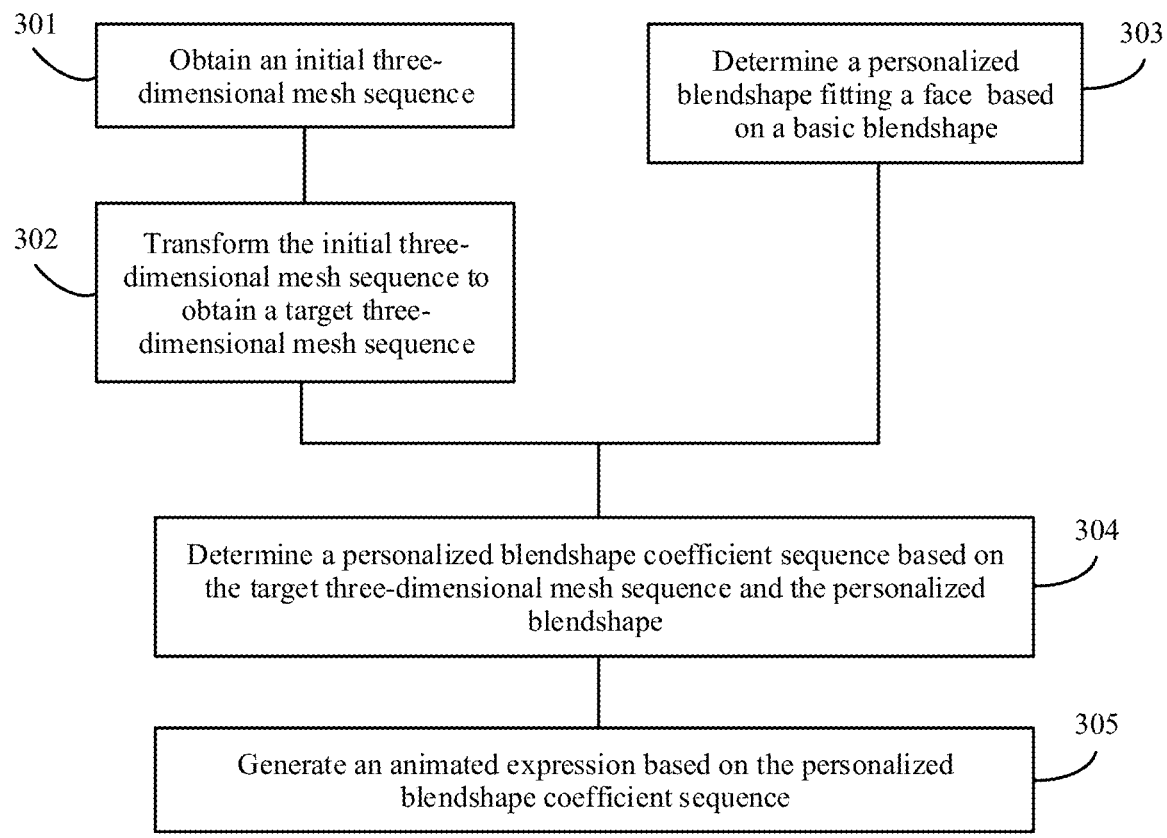
FIG. 8 is a schematic flowchart of a method for generating an animated expression according to an embodiment of this application.

FIG. 8 is a schematic flowchart of a method for generating an animated expression according to an embodiment of this application. The method shown in FIG. 8 may be performed by an electronic device. The method shown in FIG. 8 includes steps 301 to 305. The following describes these steps.

301. Obtain an initial three-dimensional mesh sequence.

The initial three-dimensional mesh sequence in step 301 includes a plurality of initial three-dimensional meshes, and the plurality of initial three-dimensional meshes are separately used to represent expression features of a face at a plurality of different moments.

The initial three-dimensional mesh in the initial three-dimensional mesh sequence is the same as the initial three-dimensional mesh obtained in step 101. The foregoing limitations and explanations on the initial three-dimensional mesh are also applicable to the initial three-dimensional mesh in the initial three-dimensional mesh sequence in step 301. To avoid repetition, details are not described herein again.

302. Transform the initial three-dimensional mesh sequence to obtain a target three-dimensional mesh sequence.

The target three-dimensional mesh sequence includes a plurality of target three-dimensional meshes, and topology structures of the plurality of target three-dimensional meshes are the same as a topology structure of the basic blendshape.

In step 302, each initial three-dimensional mesh in the initial three-dimensional mesh sequence may be transformed separately to obtain a plurality of target three-dimensional meshes, to obtain the target three-dimensional mesh sequence. For a process of transforming each initial three-dimensional mesh to obtain a target three-dimensional mesh, refer to related content in step 102. To avoid unnecessary repetition, details are not described herein.

303. Determine, based on a basic blendshape, a personalized blendshape fitting a face.

The personalized blendshape fitting the face may be a blendshape including an identity feature of the face.

In step 303, the personalized blendshape may be obtained with reference to the specific implementation in step 103, and details are not described herein again.

304. Determine a personalized blendshape coefficient sequence based on the target three-dimensional mesh sequence and the personalized blendshape.

The personalized blendshape sequence includes a plurality of groups of personalized blendshape coefficients, and combination of personalized blendshape coefficients in the personalized blendshape coefficient sequence and the personalized blendshape is used to represent the expression feature of the face.

In step 304, personalized blendshape coefficients corresponding to each target three-dimensional mesh may be generated based on each target three-dimensional mesh in the target three-dimensional mesh sequence and the personalized blendshape, to obtain a personalized blendshape coefficient sequence formed by a plurality of personalized blendshape coefficients.

When the personalized blendshape coefficients are generated based on each target three-dimensional mesh and the personalized blendshape, the specific manner in step 104 may be used to obtain the personalized blendshape coefficients.

305. Generate an animated expression based on the personalized blendshape coefficient sequence.

The animated expression generated in step 305 may be a continuous animated expression. For a process of generating an animated expression based on each personalized blendshape coefficient in the personalized blendshape coefficient sequence, refer to related content in step 105, and details are not described herein again.

In step 305, an animated expression may be generated based on the personalized blendshape coefficient sequence and an anthropomorphic role blendshape. The anthropomorphic role blendshape herein may be specifically a virtual person blendshape or an anthropomorphic animal blendshape.

The foregoing limitations and explanations on the anthropomorphic role blendshape are also applicable to the anthropomorphic role blendshape involved in step 305.

When an animated expression is generated based on the personalized blendshape coefficient sequence and the anthropomorphic role blendshape, an animated picture may be first generated based on each personalized blendshape coefficient and the anthropomorphic role blendshape, to obtain a plurality of animated pictures, and then the animated pictures are spliced together to obtain the final animated expression.

In this application, because the three-dimensional mesh includes more vertex information, the three-dimensional mesh can better reflect the expression feature of the face. In addition, by transforming the three-dimensional mesh, a topology structure of the transformed three-dimensional mesh can be consistent with the topology structure of the basic blendshape. Therefore, an animated expression closer to the expression feature of the face can be finally generated based on the transformed three-dimensional mesh.

Specifically, because the expression feature reflected by the generated animated expression is closer to the expression feature of the facial expression, the animated expression can be more realistic, and a display effect of the animated expression can be improved.

Figure 9:
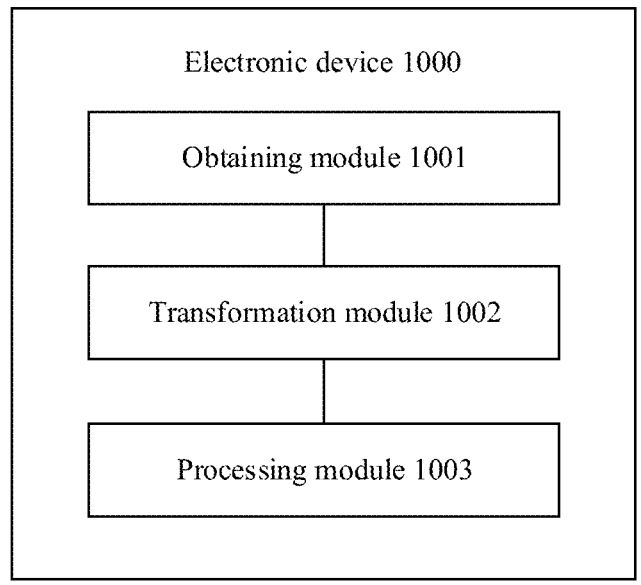
FIG. 9 is a schematic block diagram of an electronic device according to an embodiment of this application.

FIG. 9 is a schematic block diagram of an electronic device according to an embodiment of this application. The electronic device 1000 shown in FIG. 9 may perform the steps in the method for generating an animated expression shown in FIG. 1, and includes:

an obtaining module 1001, configured to obtain an initial three-dimensional mesh, where a vertex in the initial three-dimensional mesh is used to represent an expression feature of a face;

a transformation module 1002, configured to transform the initial three-dimensional mesh to obtain a target three-dimensional mesh, where a topology structure of the target three-dimensional mesh is the same as a topology structure of a basic blendshape; and a processing module 1003, where the processing module 1003 is configured to:

determine, based on the basic blendshape, a personalized blendshape fitting the face, where the personalized blendshape is a blendshape including an identity feature of the face;

determine personalized blendshape coefficients based on the target three-dimensional mesh and the personalized blendshape, where combination of the personalized blendshape coefficients and the blendshapes of the personalized blendshape is used to represent the expression feature of the face; and generate the animated expression based on the personalized blendshape coefficients.

In this application, because the three-dimensional mesh includes more vertex information, the three-dimensional mesh can better reflect the expression feature of the face. In addition, by transforming the three-dimensional mesh, a topology structure of the transformed three-dimensional mesh can be consistent with the topology structure of the basic blendshape. Therefore, an animated expression closer to the expression feature of the face can be finally generated based on the transformed three-dimensional mesh.

Optionally, in an embodiment, the personalized blendshape includes a plurality of blendshapes, the plurality of blendshapes respectively correspond to different expressions, and the processing module 1003 is configured to determine the personalized blendshape coefficients based on coordinates of a reference vertex of each of the plurality of blendshapes and coordinates of a vertex in the target three-dimensional mesh, where the reference vertex of each of the plurality of blendshapes is a point that is in each blendshape and that is at a corresponding position of the vertex in the target three-dimensional mesh.

Optionally, in an embodiment, the processing module 1003 is configured to:

determine a plurality of first differences, where the plurality of first differences are differences between coordinates of a plurality of vertices in the target three-dimensional mesh and a linear combination of corresponding reference vertices in the plurality of blendshapes; and determine the personalized blendshape coefficients based on a sum of products of the plurality of first differences and corresponding weight values.

Optionally, in an embodiment, the plurality of first differences respectively correspond to a plurality of different weight values.

Optionally, in an embodiment, the personalized blendshape includes a plurality of blendshapes, the plurality of blendshapes respectively correspond to different expressions, and the processing module is configured to:

determine a vertex distance of the target three-dimensional mesh, where the vertex distance is a distance between two vertices in the target three-dimensional mesh;

determine a reference distance corresponding to each of the plurality of blendshapes, to obtain a plurality of reference distances, where the reference distance corresponding to each blendshape is a distance between two reference vertices in each blendshape, and the two reference vertices are points that are in each blendshape and that are at corresponding positions of the two vertices in the target three-dimensional mesh; and determine the personalized blendshape coefficients based on a difference between a linear combination of the plurality of reference distances and the vertex distance.

Optionally, in an embodiment, the processing module 1003 is configured to:

determine a plurality of second differences, where the plurality of second differences are differences between a plurality of vertex distances in the target three-dimensional mesh and a linear combination of corresponding reference distances in the plurality of blendshapes; and determine the personalized blendshape coefficients based on a sum of products of the plurality of second differences and corresponding weight values.

Optionally, in an embodiment, the plurality of second differences respectively correspond to a plurality of different weight values.

Optionally, in an embodiment, the transformation module 1002 is configured to:

determine a topology reference mesh, where a topology structure of the topology reference mesh is the same as the topology structure of the basic blendshape;

perform rigid deformation on the topology reference mesh to obtain a rigidly deformed topology reference mesh, where a size of the rigidly deformed topology reference mesh is the same as a size of the initial three-dimensional mesh;

perform fitting processing on the rigidly deformed topology reference mesh and the initial three-dimensional mesh until a fitting degree between the rigidly deformed topology reference mesh and the initial three-dimensional mesh meets a preset fitting degree; and replace coordinates of vertices in the rigidly deformed topology reference mesh with coordinates of vertices that are in the initial three-dimensional mesh and that fit the vertices in the rigidly deformed mesh, to obtain the target three-dimensional mesh, where the target three-dimensional mesh has the topology structure of the topology reference mesh and a shape of the initial three-dimensional mesh.

Optionally, in an embodiment, the transformation module 1002 is configured to repeat step A and step B until a fitting degree between a non-rigidly deformed topology reference mesh and the initial three-dimensional mesh meets a preset fitting degree.

Step A and step B are respectively as follows:

Step A: Perform non-rigid deformation on the rigidly deformed topology reference mesh based on an RBF, to obtain a non-rigidly deformed topology reference mesh.

Step B: Fit the non-rigidly deformed topology reference mesh to the initial three-dimensional mesh.

Figure 10:
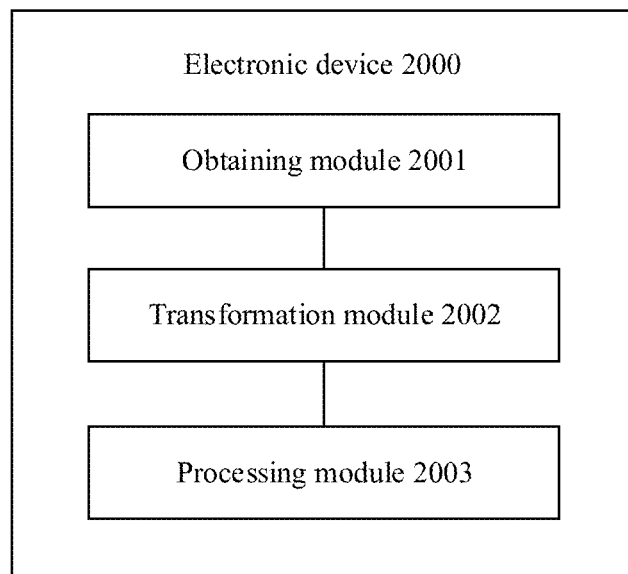
FIG. 10 is a schematic block diagram of an electronic device according to an embodiment of this application.

FIG. 10 is a schematic block diagram of an electronic device according to an embodiment of this application. The electronic device 2000 shown in FIG. 10 may perform the steps in the method for generating an animated expression shown in FIG. 8, and includes:

an obtaining module 2001, configured to obtain an initial three-dimensional mesh sequence, where the initial three-dimensional mesh sequence includes a plurality of initial three-dimensional meshes, and the plurality of initial three-dimensional meshes are separately used to represent expression features of a face at a plurality of different moments;

a transformation module 2002, configured to transform the initial three-dimensional mesh sequence to obtain a target three-dimensional mesh sequence, where the target three-dimensional mesh sequence includes a plurality of target three-dimensional meshes, and topology structures of the plurality of target three-dimensional meshes are the same as a topology structure of a basic blendshape; and a processing module 2003, where the processing module 2003 is configured to:

determine, based on the basic blendshape, a personalized blendshape fitting the face, where the personalized blendshape is a blendshape including an identity feature of the face;

generate a personalized blendshape coefficient sequence based on the target three-dimensional mesh sequence and the personalized blendshape, where the personalized blendshape sequence includes a plurality of groups of personalized blendshape coefficients, and combination of the personalized blendshape coefficients in the personalized blendshape coefficient sequence and blendshapes in the personalized blendshape is used to represent the expression feature of the face; and generate the animated expression based on the personalized blendshape coefficient sequence.

In this application, because the three-dimensional mesh includes more vertex information, the three-dimensional mesh can better reflect the expression feature of the face. In addition, by transforming the three-dimensional mesh, a topology structure of the transformed three-dimensional mesh can be consistent with the topology structure of the basic blendshape. Therefore, an animated expression closer to the expression feature of the face can be finally generated based on the transformed three-dimensional mesh.

Figure 11:
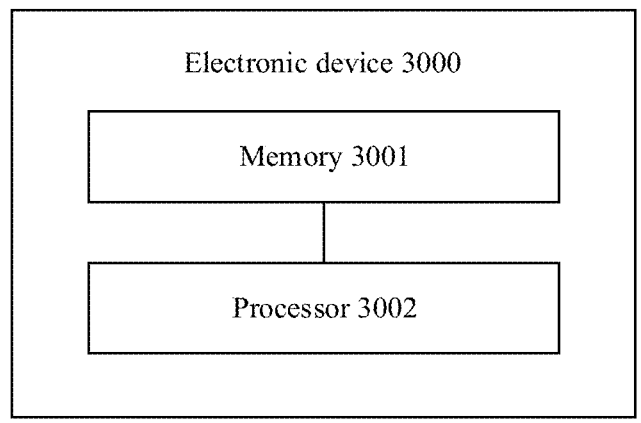
FIG. 11 is a schematic block diagram of an electronic device according to an embodiment of this application.

FIG. 11 is a schematic block diagram of an electronic device according to an embodiment of this application. The electronic device 3000 shown in FIG. 11 includes:

a memory 3001, configured to store a program; and a processor 3002, configured to execute the program stored in the memory 3001, where when the program stored in the memory 3001 is executed by the processor 3002, the processor 3002 is configured to perform the steps in the method for generating an animated expression shown in FIG. 1 or FIG. 8.

It should be understood that the obtaining module 1001, the transformation module 1002, and the processing module 1003 in the electronic device 1000 may be equivalent to the processor 3002 in the electronic device 3000. The obtaining module 2001, the transformation module 2002, and the processing module 2003 in the electronic device 2000 may be equivalent to the processor 3002 in the electronic device 3000.

The processor 3002 may be specifically a central processing unit (central processing unit, CPU), a field programmable gate array (field programmable gate array, FPGA), a graphics processing unit (graphics processing unit, GPU), another chip having a data processing function, or the like. The processor 3002 may alternatively be formed by at least two of a CPU, an FPGA, a GPU, and a data processing chip.

Figure 12:
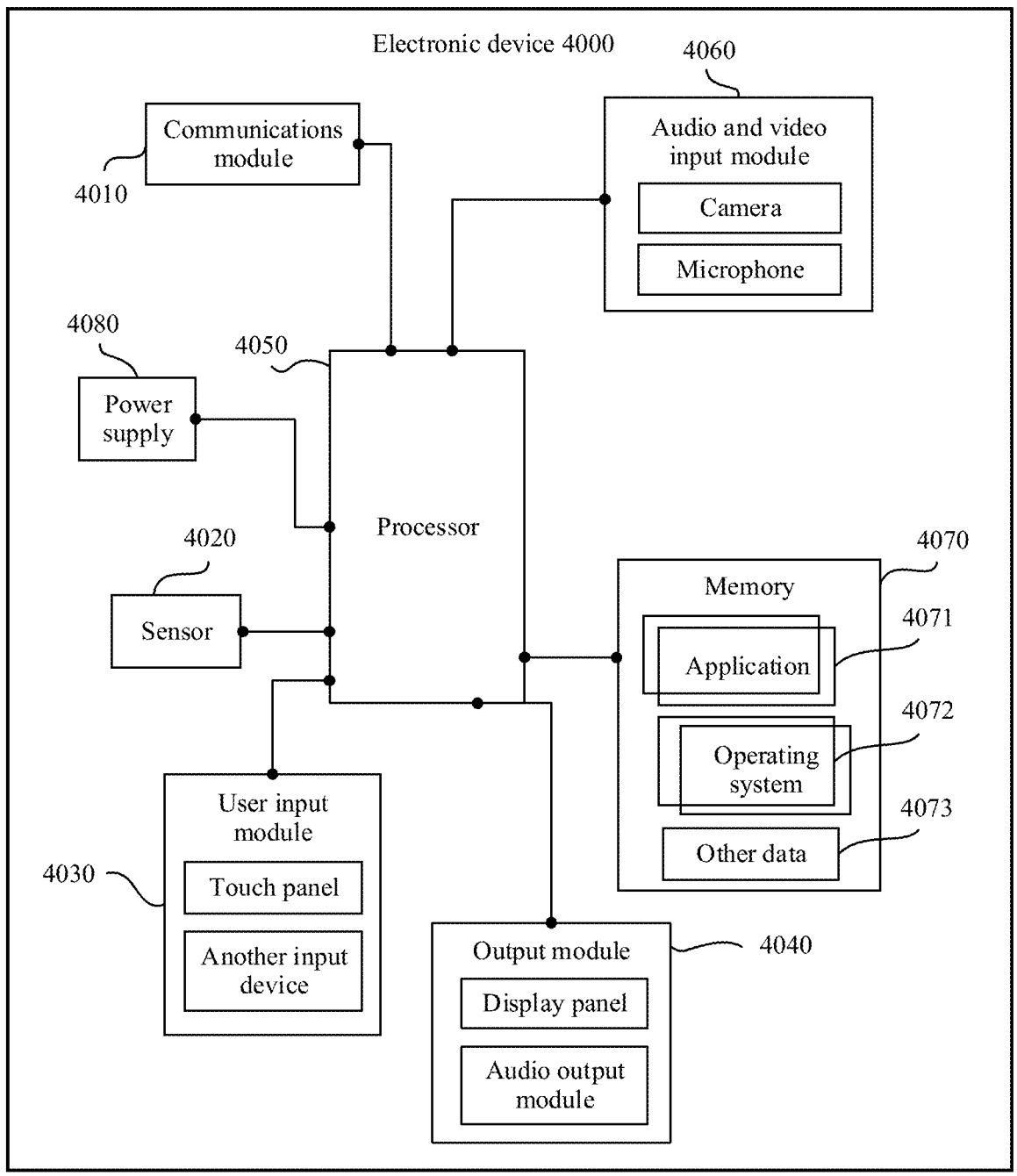
FIG. 12 is a schematic block diagram of an electronic device according to an embodiment of this application.

FIG. 12 is a schematic block diagram of an electronic device according to an embodiment of this application.

The electronic device 4000 in FIG. 12 includes a communications module 4010, a sensor 4020, a user input module 4030, an output module 4040, a processor 4050, an audio and video input module 4060, a memory 4070, and a power supply 4080.

The electronic device 4000 may perform the steps in the method for generating an animated expression in the foregoing embodiments of this application. Specifically, the processor 4050 in the electronic device 4000 may perform the steps in the method for generating an animated expression in the embodiments of this application.

The following describes each module or unit in the electronic device 4000 in detail.

The communications module 4010 may include at least one module that can enable the electronic device to communicate with another electronic device. For example, the communications module 4010 may include one or more of a wired network interface, a broadcast receiving module, a mobile communications module, a wireless Internet module, a local area communications module, a position (or location) information module, and the like.

The sensor 4020 may sense some operations of a user, and the sensor 4020 may include a proximity sensor, a touch sensor, and the like. The sensor 4020 may sense an operation such as touching a screen or approaching a screen by a user.

The user input module 4030 is configured to receive input digital information, character information, or a contact touch operation/non-contact gesture, receive signal input related to user setting and function control of a system, and the like. The user input module 4030 includes a touch panel and/or another input device.

The output module 4040 includes a display panel, configured to display information input by a user, information provided for the user, various menu interfaces of the system, and the like. Optionally, the display panel may be configured in a form of a liquid crystal display (LCD), an organic light-emitting diode (OLED), or the like. In some other embodiments, the touch panel may cover the display panel to form a touch display screen. In addition, the output module 4040 may further include an audio output module, an alarm, a tactile module, and the like.

The audio and video input module 4060 is configured to input an audio signal or a video signal. The audio and video input module 4060 may include a camera and a microphone.

The power supply 4080 may receive external power and internal power under control of the processor 4050, and provide power required when each module of the entire electronic device runs.

The processor 4050 may be one or more processors. For example, the processor 4050 may include one or more central processing units, or include one central processing unit and one graphics processing unit, or include one application processor and one coprocessor (for example, a microcontrol unit or a neural network processor). When the processor 4050 includes a plurality of processors, the plurality of processors may be integrated on a same chip, or may be chips independent of each other. One processor may include one or more physical cores, where the physical core is a smallest processing module.

The memory 4070 stores a computer program, and the computer program includes an operating system program 4072, an application program 4071, and the like. Typical operating systems include systems used for desktops or laptops such as Windows of Microsoft and MacOS of Apple, and systems used for mobile terminals such as Linux®-based Android (Android®) system developed by Google. When a resource scheduling electronic device in this embodiment of this application is implemented by using software, it may be considered that the resource scheduling electronic device is specifically implemented by using the application program 4071.

The memory 4070 may be one or more of the following types: a flash (flash) memory, a hard disk type memory, a micro multimedia card-type memory, a card-type memory (for example, an SD or XD memory), a random access memory (random access memory, RAM), and a static random access memory (static RAM, SRAM), a read-only memory (read-only memory, ROM), an electrically erasable programmable read-only memory (electrically erasable programmable read-only memory, EEPROM), a programmable read-only memory (programmable ROM, PROM), a magnetic memory, a magnetic disk, or an optical disc. In some other embodiments, the memory 4070 may alternatively be a network storage device on the Internet, and the system may perform an operation such as updating or reading on the memory 4070 on the Internet.

The processor 4050 is configured to read the computer program in the memory 4070, and then execute an electronic device defined by the computer program. For example, the processor 4050 reads the operating system program 4072, to run an operating system in the system and implement various functions of the operating system, or reads one or more application programs 4071, to run an application in the system.

For example, the memory 4070 may store a computer program (the computer program is a program corresponding to the resource scheduling electronic device in this embodiment of this application). When the processor 4050 performs the computer program, the processor 4050 can perform the resource scheduling electronic device in this embodiment of this application.

The memory 4070 further stores other data 4073 than the computer program. For example, the memory 4070 may store a load characteristic of a frame drawing thread and a predicted load value of the frame drawing thread that are involved in the resource scheduling electronic device in this application.

A connection relationship between modules or units in the electronic device 4000 shown in FIG. 12 is merely an example. The electronic device in this embodiment of this application may be an electronic device obtained by connecting the modules or units in FIG. 12 by using another connection relationship (for example, all the modules or units are connected by using a bus).

The memory 3001 in the electronic device 3000 is equivalent to the memory 4070 in the electronic device 4000, and the processor 3002 in the electronic device 3000 is equivalent to the memory 4050 in the electronic device 4000.

The electronic device 1000, the electronic device 2000, the electronic device 3000, and the electronic device 4000 may be specifically a mobile terminal (for example, a smartphone), a computer, a personal digital assistant, a wearable device, an in-vehicle device, an Internet of Things device, an AR device, a VR device, or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps in the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for generating an animated expression, comprising:
    obtaining an initial three-dimensional mesh, wherein the initial three-dimensional mesh includes multiple vertices, the vertices in the initial three-dimensional mesh representing a human face;
    transforming the initial three-dimensional mesh to obtain a target three-dimensional mesh, wherein a topology structure of the target three-dimensional mesh is the same as a topology structure of a basic blendshape;
    determining, based on blendshapes corresponding to the basic blendshape, a personalized blendshape fitting the human face, wherein the personalized blendshape comprises a combination of a plurality of blendshapes, the plurality of blendshapes correspond to different expressions;
    determining, based on the target three-dimensional mesh and the personalized blendshape, personalized blendshape coefficients, a combination of the personalized blendshape coefficients and the plurality of blendshapes of the personalized blendshape representing the expression feature of the face; and generating, based on the personalized blendshape coefficients, the animated expression.

2. The method according to claim 1, wherein the determining, based on the target three-dimensional mesh and the personalized blendshape, personalized blendshape coefficients comprises:

determining, based on coordinates of a reference vertex of each of the plurality of blendshapes and coordinates of a vertex in the target three-dimensional mesh, the personalized blendshape coefficients, wherein the reference vertex of each of the plurality of blendshapes is a point that is in each blendshape and that is at a corresponding position of the vertex in the target three-dimensional mesh.

3. The method according to claim 2, wherein the determining, based on coordinates of a reference vertex of each of the plurality of blendshapes and coordinates of a vertex in the target three-dimensional mesh, the personalized blendshape coefficients comprises:

determining a plurality of first differences, wherein the plurality of first differences are differences between coordinates of a plurality of vertices in the target three-dimensional mesh and a linear combination of corresponding reference vertices in the plurality of blendshapes; and determining, based on a sum of products of the plurality of first differences and corresponding weight values, the personalized blendshape coefficients.

4. The method according to claim 3, wherein the plurality of first differences respectively correspond to a plurality of different weight values.

5. The method according to claim 1, wherein the determining, based on the target three-dimensional mesh and the personalized blendshape, personalized blendshape coefficients comprises:

determining a vertex distance of the target three-dimensional mesh, wherein the vertex distance is a distance between two vertices in the target three-dimensional mesh;

determining a reference distance corresponding to each of the plurality of blendshapes, to obtain a plurality of reference distances, wherein the reference distance corresponding to each blendshape is a distance between two reference vertices in each blendshape, and the two reference vertices are points that are in each blendshape and that are at corresponding positions of the two vertices in the target three-dimensional mesh; and determining, based on a difference between a linear combination of the plurality of reference distances and the vertex distance, the personalized blendshape coefficients.

6. The method according to claim 5, wherein the determining, based on a difference between a linear combination of the plurality of reference distances and the vertex distance, the personalized blendshape coefficients comprises:

determining a plurality of second differences, wherein the plurality of second differences are differences between a plurality of vertex distances in the target three-dimensional mesh and a linear combination of corresponding reference distances in the plurality of blendshapes; and determining, based on a sum of products of the plurality of second differences and corresponding weight values, the personalized blendshape coefficients.

7. The method according to claim 6, wherein the plurality of second differences respectively correspond to a plurality of different weight values.

8. The method according to claim 1, wherein the transforming the initial three-dimensional mesh to obtain a target three-dimensional mesh comprises:

determining a topology reference mesh, wherein a topology structure of the topology reference mesh is the same as the topology structure of the basic blendshape;

performing rigid deformation on the topology reference mesh, to obtain a rigidly deformed topology reference mesh, wherein a size of the rigidly deformed topology reference mesh is the same as a size of the initial three-dimensional mesh;

performing fitting processing on the rigidly deformed topology reference mesh and the initial three-dimensional mesh until a fitting degree between the rigidly deformed topology reference mesh and the initial three-dimensional mesh meets a preset fitting degree; and replacing coordinates of vertices in the rigidly deformed topology reference mesh with coordinates of vertices that are in the initial three-dimensional mesh and that fit the vertices in the rigidly deformed mesh, to obtain the target three-dimensional mesh, wherein the target three-dimensional mesh has the topology structure of the topology reference mesh and a shape of the initial three-dimensional mesh.

9. The method according to claim 8, wherein the performing fitting processing on the rigidly deformed topology reference mesh and the initial three-dimensional mesh until a fitting degree between the rigidly deformed topology reference mesh and the initial three-dimensional mesh meets a preset fitting degree comprises:

repeating step A and step B until a fitting degree between a non-rigidly deformed topology reference mesh and the initial three-dimensional mesh meets the preset fitting degree; and step A and step B are respectively as follows:

step A: performing, based on a radial basis function (RBF), non-rigid deformation on the rigidly deformed topology reference mesh, to obtain a non-rigidly deformed topology reference mesh; and step B: fitting the non-rigidly deformed topology reference mesh to the initial three-dimensional mesh.

10. A method for generating an animated expression, comprising:

obtaining an initial three-dimensional mesh sequence, wherein the initial three-dimensional mesh sequence comprises a plurality of initial three-dimensional meshes, and the plurality of initial three-dimensional meshes are separately used to represent expression features of a human face at a plurality of different moments;

transforming the initial three-dimensional mesh sequence to obtain a target three-dimensional mesh sequence, wherein the target three-dimensional mesh sequence comprises a plurality of target three-dimensional meshes, and a topology structure of the plurality of target three-dimensional meshes is the same as a topology structure of a basic blendshape; and determining, based on blendshapes corresponding to the basic blendshape, a personalized blendshape fitting the human face, wherein the personalized blendshape comprises a combination of a plurality of blendshapes, the plurality of blendshapes correspond to different expressions;

generating, based on the target three-dimensional mesh sequence and the personalized blendshape, a personalized blendshape coefficient sequence, wherein the personalized blendshape sequence comprises a plurality of groups of personalized blendshape coefficients, and a combination of the personalized blendshape coefficients in the personalized blendshape coefficient sequence and the plurality of blendshapes of the personalized blendshape is used to represent the expression feature of the face; and generating, based on the personalized blendshape coefficient sequence, the animated expression.

11. An electronic device, comprising:

a non-transitory computer-readable storage medium storing instructions; and one or more processors in communication with the medium and upon execution of the instructions, configured to:

obtain an initial three-dimensional mesh, wherein the initial three-dimensional mesh includes multiple vertices, the vertices in the initial three-dimensional mesh representing an expression feature of a human face;

transform the initial three-dimensional mesh to obtain a target three-dimensional mesh, wherein a topology structure of the target three-dimensional mesh is the same as a topology structure of a basic blendshape;

determine, based on blendshapes corresponding to the basic blendshape, a personalized blendshape fitting the human face, wherein the personalized blendshape comprises a combination of a plurality of blendshapes, the plurality of blendshapes correspond to different expressions;

determine, based on the target three-dimensional mesh and the personalized blendshape, personalized blendshape coefficients, a combination of the personalized blendshape coefficients and the plurality of blendshapes of the personalized blendshape representing the expression feature of the face; and generate, based on the personalized blendshape coefficients, the animated expression.

12. The electronic device according to claim 11, wherein the one or more processors is configured to:

determine, based on coordinates of a reference vertex of each of the plurality of blendshapes and coordinates of a vertex in the target three-dimensional mesh, the personalized blendshape coefficients, wherein the reference vertex of each of the plurality of blendshapes is a point that is in each blendshape and that is at a corresponding position of the vertex in the target three-dimensional mesh.

13. The electronic device according to claim 12, wherein the one or more processors is configured to:

determine a plurality of first differences, wherein the plurality of first differences are differences between coordinates of a plurality of vertices in the target three-dimensional mesh and a linear combination of corresponding reference vertices in the plurality of blendshapes; and determine, based on a sum of products of the plurality of first differences and corresponding weight values, the personalized blendshape coefficients.

14. The electronic device according to claim 13, wherein the plurality of first differences respectively correspond to a plurality of different weight values.

15. The electronic device according to claim 11, wherein the one or more processors is configured to:

determine a vertex distance of the target three-dimensional mesh, wherein the vertex distance is a distance between two vertices in the target three-dimensional mesh;

determine a reference distance corresponding to each of the plurality of blendshapes, to obtain a plurality of reference distances, wherein the reference distance corresponding to each blendshape is a distance between two reference vertices in each blendshape, and the two reference vertices are points that are in each blendshape and that are at corresponding positions of the two vertices in the target three-dimensional mesh; and determine, based on a difference between a linear combination of the plurality of reference distances and the vertex distance, the personalized blendshape coefficients.

16. The electronic device according to claim 15, wherein the one or more processors is configured to:

determine a plurality of second differences, wherein the plurality of second differences are differences between a plurality of vertex distances in the target three-dimensional mesh and a linear combination of corresponding reference distances in the plurality of blendshapes; and determine, based on a sum of products of the plurality of second differences and corresponding weight values, the personalized blendshape coefficients.

17. The electronic device according to claim 16, wherein the plurality of second differences respectively correspond to a plurality of different weight values.

18. The electronic device according to claim 11, wherein the one or more processors is configured to:

determine a topology reference mesh, wherein a topology structure of the topology reference mesh is the same as the topology structure of the basic blendshape;

perform rigid deformation on the topology reference mesh, to obtain a rigidly deformed topology reference mesh, wherein a size of the rigidly deformed topology reference mesh is the same as a size of the initial three-dimensional mesh;

perform fitting processing on the rigidly deformed topology reference mesh and the initial three-dimensional mesh until a fitting degree between the rigidly deformed topology reference mesh and the initial three-dimensional mesh meets a preset fitting degree; and replace coordinates of vertices in the rigidly deformed topology reference mesh with coordinates of vertices that are in the initial three-dimensional mesh and that fit the vertices in the rigidly deformed mesh, to obtain the target three-dimensional mesh, wherein the target three-dimensional mesh has the topology structure of the topology reference mesh and a shape of the initial three-dimensional mesh.

19. The electronic device according to claim 18, wherein the one or more processors is configured to repeatedly perform step A and step B until the fitting degree between the non-rigidly deformed topology reference mesh and the initial three-dimensional mesh meets the preset fitting degree; wherein step A and step B are respectively as follows:

step A: performing, based on a radial basis function (RBF), non-rigid deformation on the rigidly deformed topology reference mesh, to obtain a non-rigidly deformed topology reference mesh; and step B: fitting the non-rigidly deformed topology reference mesh to the initial three-dimensional mesh.

* * * * *